(12) United States Patent
Miyajima et al.

(10) Patent No.: US 6,919,980 B2
(45) Date of Patent: Jul. 19, 2005

(54) MIRROR ROCKING MEMBER FOR OPTICAL DEFLECTOR

(75) Inventors: Hiroshi Miyajima, Hachioji (JP); Michitsugu Arima, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/004,660

(22) Filed: Dec. 3, 2001

(65) Prior Publication Data

US 2002/0118429 A1 Aug. 29, 2002

(30) Foreign Application Priority Data

Dec. 18, 2000 (JP) ........................................ 2000-383847

(51) Int. Cl.[7] .............................................. G02B 26/08
(52) U.S. Cl. ...................................... 359/224; 359/872
(58) Field of Search ................................ 359/224, 223, 359/225, 871, 872, 876, 877, 883

(56) References Cited

U.S. PATENT DOCUMENTS

| | | | |
|---|---|---|---|
| 4,421,381 A | 12/1983 | Ueda et al. | |
| 5,740,150 A | 4/1998 | Uchimaru et al. | 369/119 |
| 6,108,118 A * | 8/2000 | Minamoto | 359/224 |
| 6,188,504 B1 * | 2/2001 | Murakami et al. | 359/224 |
| 6,411,427 B1 * | 6/2002 | Peeters et al. | 359/298 |

FOREIGN PATENT DOCUMENTS

| | | |
|---|---|---|
| DE | 41 00 358 A1 | 7/1992 |
| EP | 0 686 863 A1 | 12/1995 |
| JP | 10-62709 | 3/1998 |

OTHER PUBLICATIONS

Asada, N., et al., "Silicon micro–optical scanner", Sensors and ActuatorsA, Elsevier Sequoia S.A. Lausanne, CH, vol. 83, No. 1–3, May 2000, pp. 284–290.

\* cited by examiner

Primary Examiner—Euncha P. Cherry
(74) Attorney, Agent, or Firm—Scully, Scott, Murphy & Presser

(57) ABSTRACT

There is disclosed a mirror rocking member for an optical deflector. The optical deflector comprises the mirror rocking member for deflecting light, and a driver for driving the member. The mirror rocking member comprises a movable plate having a reflective surface, an elastic member for rockably supporting the movable plate, and a support for supporting the elastic member. The movable plate has an electric element, which constitutes a part of the driver. The movable plate includes a first portion having the reflective surface, and a second portion including an electric element. The first portion has a reflective-surface forming surface with the reflective surface formed thereon, the second portion has an electric-element forming surface with the electric element formed thereon, and the reflective-surface forming surface has an area smaller than an area of the electric-element forming surface.

2 Claims, 15 Drawing Sheets

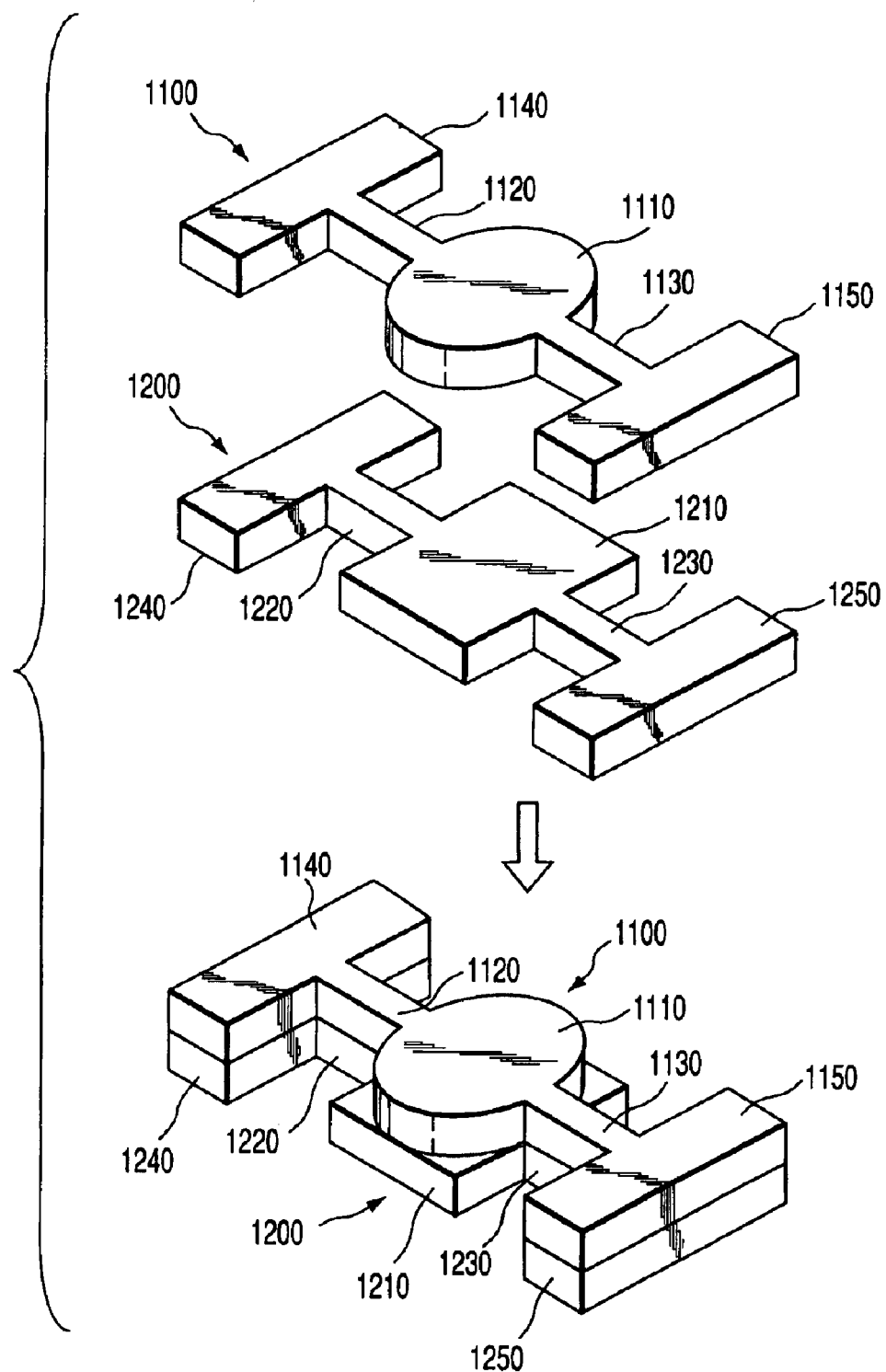
F I G. 9

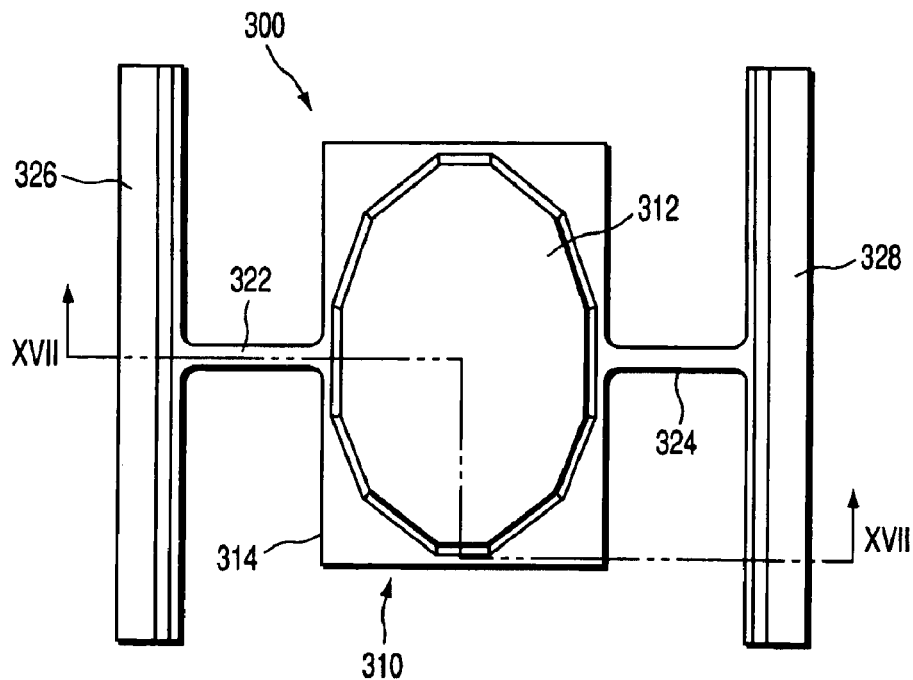
F I G. 16
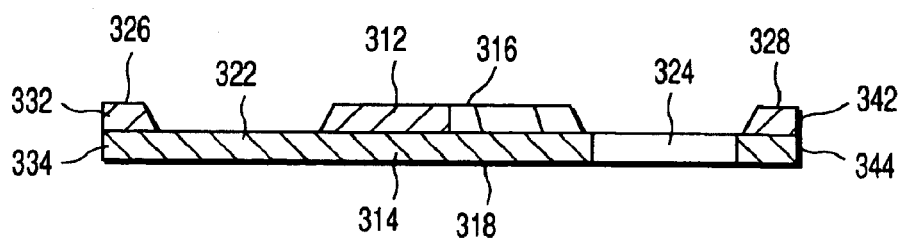
F I G. 17
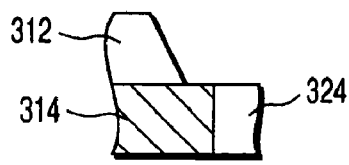 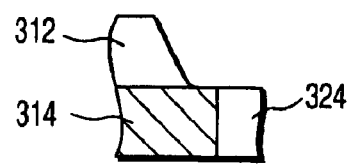
F I G. 18A   F I G. 18B

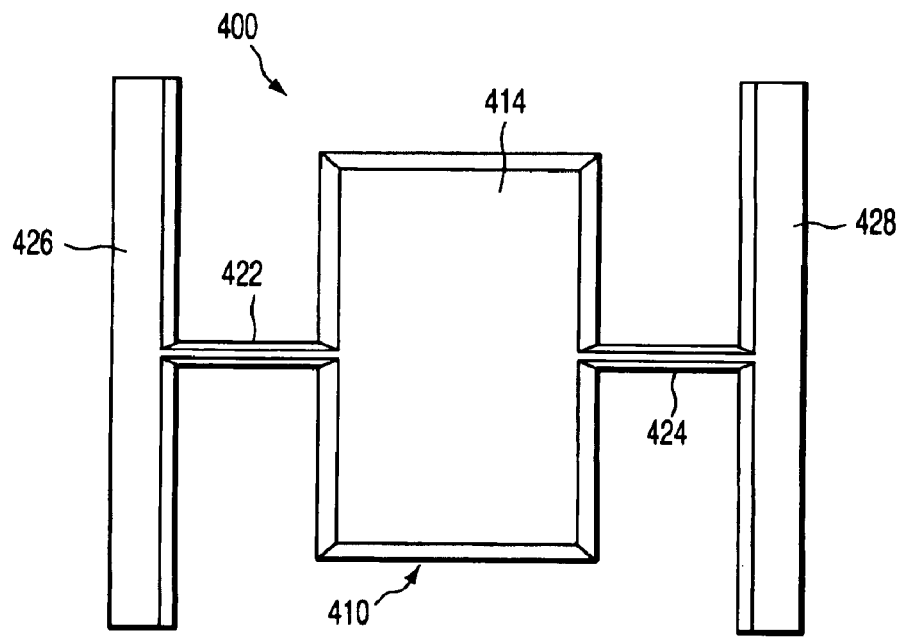
F I G. 21
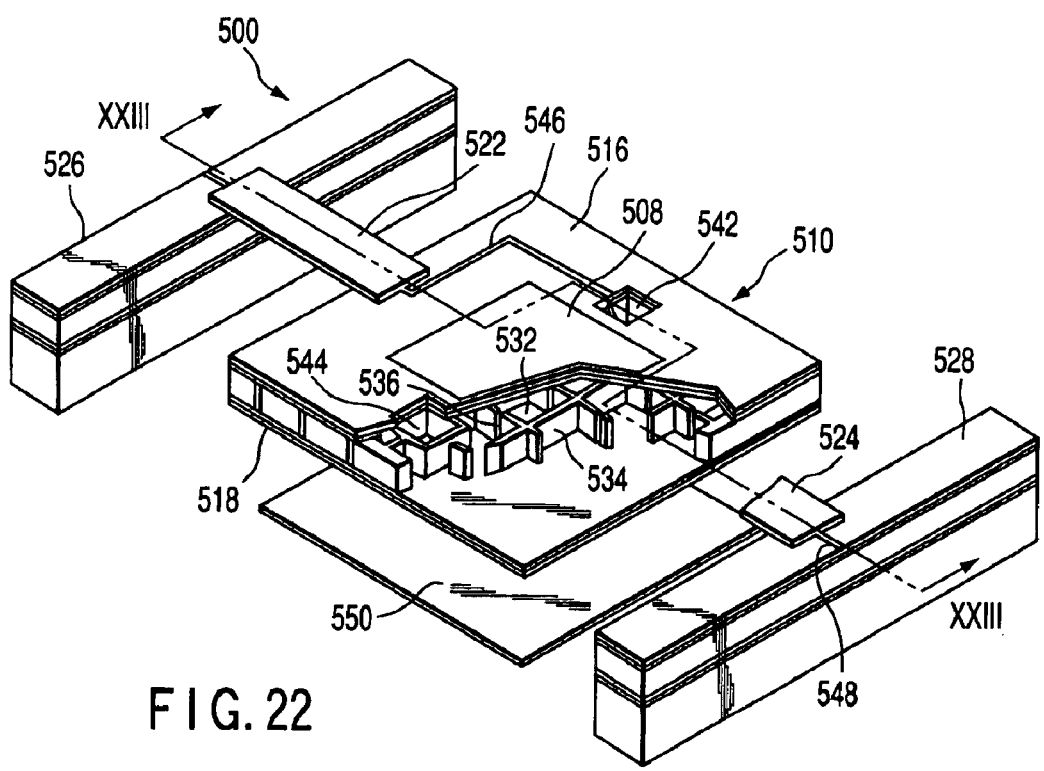
F I G. 22

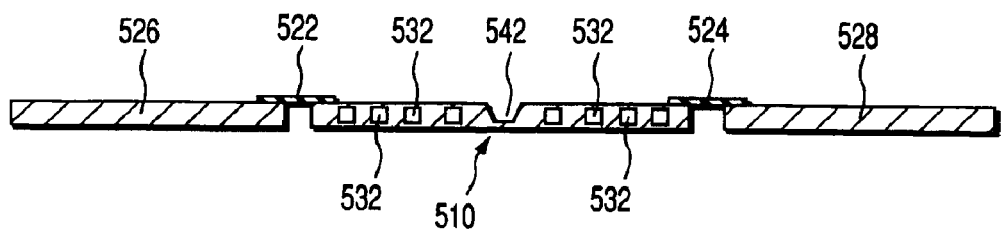
F I G. 23
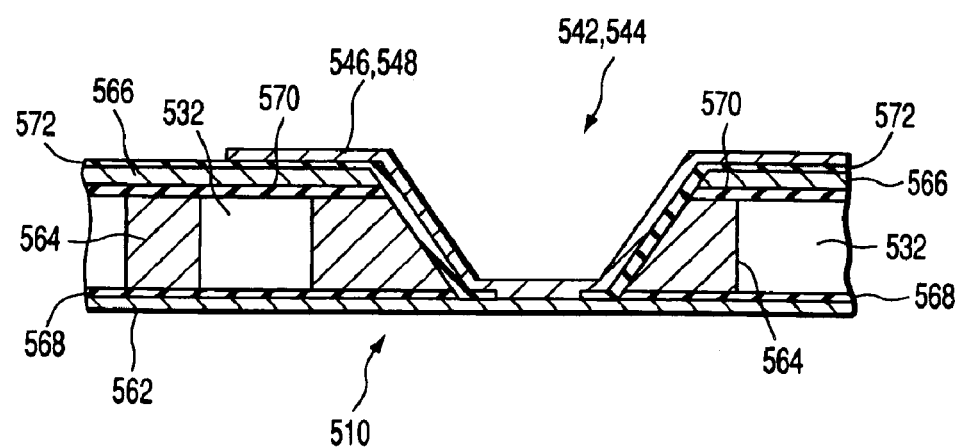
F I G. 24

MIRROR ROCKING MEMBER FOR OPTICAL DEFLECTOR

CROSS-REFERENCE TO RELATED APPLICATIONS

This application is based upon and claims the benefit of priority from the prior Japanese Patent Application No. 2000-383847, filed Dec. 18, 2000, the entire contents of which are incorporated herein by reference.

BACKGROUND OF THE INVENTION

1. Field of the Invention

The present invention relates to a mirror rocking member for use in an optical deflector, in particular, which comprises a movable mirror having a reflective surface and rockably supported, and which rocks the movable mirror to change a direction of the reflective surface and thereby changes the direction of a light beam reflected by the reflective surface.

2. Description of the Related Art

A miniaturized optical deflector, which is constituted by using a micro-machining technique to integrally form a mirror, elastic member, and driving means, has been proposed. In general, for a high-speed operation of the optical deflector, a driving system with a driving frequency compatible with a resonant frequency is used. However, the resonant frequency is inversely proportional to the square root of a moment of inertia of a movable portion with the mirror formed thereon, and is proportional to the square root of rigidity of the elastic member supporting the movable portion. On the other hand, a deflection angle is proportional to a driving force, and inversely proportional to the rigidity of the elastic member. This shows that the moment of inertia of a movable plate is effectively reduced in order to obtain a large deflection angle with a small force (raise a driving efficiency).

Jpn. Pat. Appln. KOKAI Publication No. 10-62709 discloses a galvano-mirror apparatus, which includes an elliptical movable mirror. A light beam for general use has a circular sectional shape, such that a spot projected on the movable mirror will be circular or elliptical. The galvano-mirror apparatus has a movable mirror formed in an elliptical shape, not a rectangular shape, so that the moment of inertia is reduced and the driving efficiency is enhanced. The elliptical movable mirror has a moment of inertia reduced to about 60% as compared with the rectangular movable mirror.

In the galvano-mirror apparatus, with reduction of the moment of inertia of the movable mirror, an area of a driving electrode for rocking the movable mirror is also reduced. When a whole back surface of the movable mirror is assumed to be a driving electrode, a driving torque of a neutral time by an elliptical electrode is about 66% of the driving torque of the neutral time by a rectangular electrode. Since a decrease ratio of the driving torque of the neutral time is smaller than that of the moment of inertia, the driving efficiency is generally improved, but this cannot be said to be a remarkable improvement.

Moreover, the moment of inertia of the movable mirror is reduced by decreasing a thickness of the mirror without changing the shape of the mirror. A digital micro-mirror device (DMD) prepared by the micro-machining technique has mirrors, each of which has a size of an about ten micrometer square, and which are integrated in an array. The mirror is formed of an Al thin film, has a remarkably small moment of inertia, and can therefore operate at a high speed. The reduction of the thickness of the movable mirror deteriorates the rigidity of the movable mirror. In the DMD, since the mirror is as small as about 15 $\mu$m square, a large problem does not arise. In a mirror having a size of several millimeter squares, however, excessive reduction of the thickness of the mirror deteriorates a dynamic flatness.

BRIEF SUMMARY OF THE INVENTION

An object of the present invention is to provide a mirror rocking member for an optical deflector, in which a moment of inertia of a movable portion is reduced while maintaining optical properties.

According to the present invention, there is provided a mirror rocking member for an optical deflector, which comprises the mirror rocking member for deflecting light, and driving means for driving the member. The mirror rocking member comprises a movable plate having a reflective surface, an elastic member for rockably supporting the movable plate, and a support for supporting the elastic member. The movable plate has an electric element, which constitutes a part of the driver. The movable plate includes a first portion having the reflective surface, and a second portion including an electric element. The first portion has a reflective-surface forming surface with the reflective surface formed thereon, the second portion has an electric-element forming surface with the electric element formed thereon, and the reflective-surface forming surface has an area smaller than that of the electric-element forming surface. The reflective-surface forming surface of the first portion has a shape that is substantially inscribed with a shape of the electric-element forming surface of the second portion.

Moreover, according to the present invention, there is provided a mirror rocking member for an optical deflector, which comprises the mirror rocking member for deflecting light, and driving means for driving the member. The mirror rocking member comprises a movable plate having a reflective surface, an elastic member for rockably supporting the movable plate, and a support for supporting the elastic member. The movable plate has an electric element, which constitutes a part of the driver. The movable plate includes a reflective-surface forming surface with the reflective surface formed thereon, an electric-element forming surface with the electric element formed thereon, and at least one hollow formed inside the movable plate.

According to the present invention, there is provided a mirror rocking member for an optical deflector, which has a reduced moment of inertia of a movable portion without reduction in optical properties. Such mirror rocking member contributes to improvement of a driving efficiency of the optical deflector using the same.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 shows another method for preparing the mirror rocking member of FIG. 1.

FIG. 16 is a plan view of the mirror rocking member according to a third embodiment of the invention as viewed from its reflective mirror.

FIG. 17 is a sectional view of the mirror rocking member taken along line XVII—XVII of FIG. 16.

FIGS. 18A and 18B show the connected portion of the movable plate and elastic member shown in FIG. 16 in an enlarged manner.

FIG. 21 is a plan view of the mirror rocking member shown in FIG. 19 as viewed from its back side.

FIG. 22 is a perspective view of an optical deflector using the mirror rocking member according to a fifth embodiment of the invention.

FIG. 23 is a sectional view of the mirror rocking member taken along line XXIII—XXIII of FIG. 22.

FIG. 24 is a sectional view showing a peripheral portion of a contact hole in the mirror rocking member shown in FIGS. 22 and 23 in an enlarged manner.

DETAILED DESCRIPTION OF THE INVENTION

Embodiments of the present invention will be described hereinafter with reference to the drawings.

First Embodiment

A first embodiment will first be described with reference to the drawings.

Figure 1:
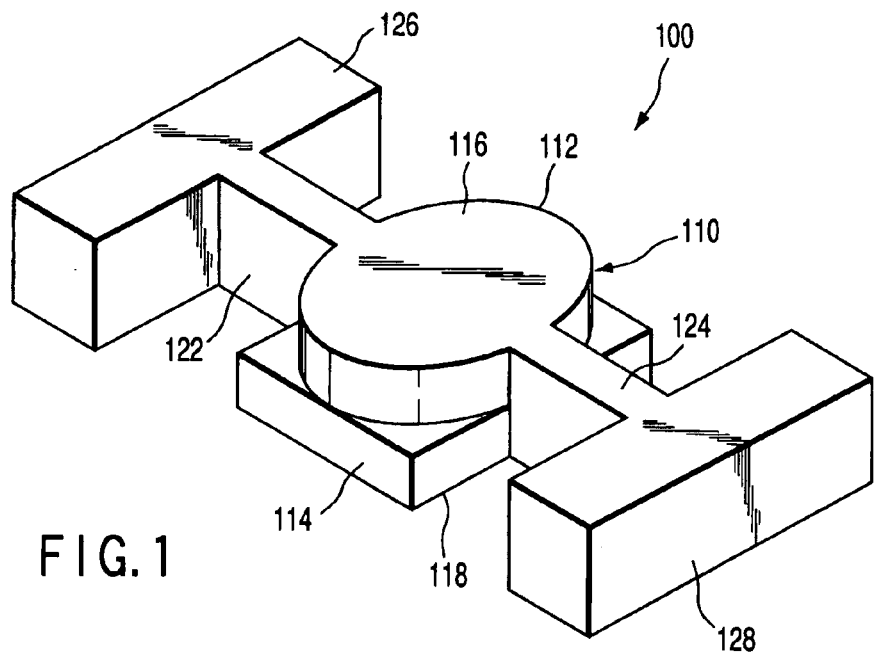
FIG. 1 is a perspective view of a mirror rocking member according to a first embodiment of the invention.
Figure 2:
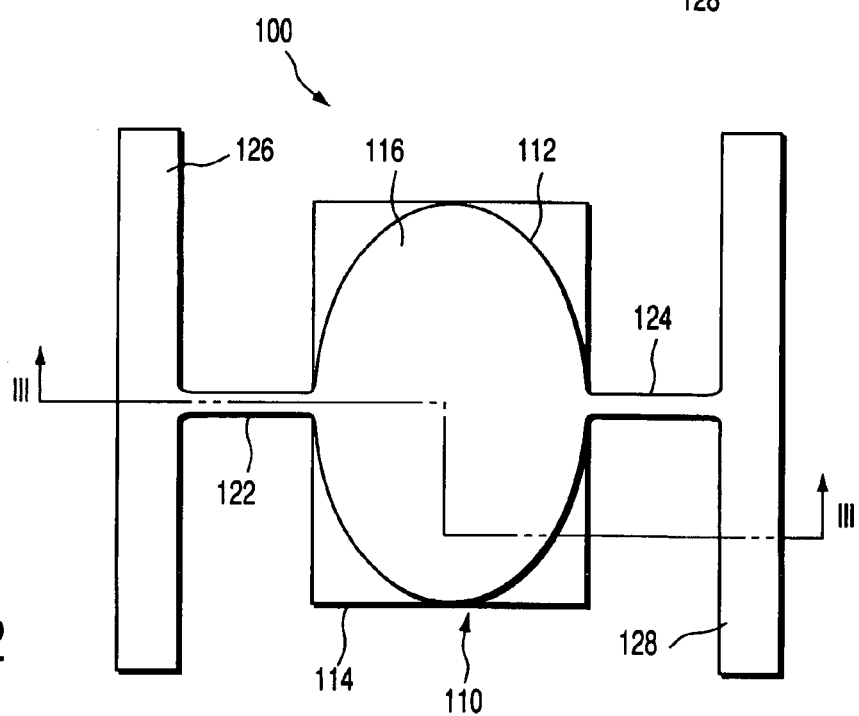
FIG. 2 is a plan view of the mirror rocking member shown in FIG. 1 as viewed from its reflective mirror.
Figure 3:
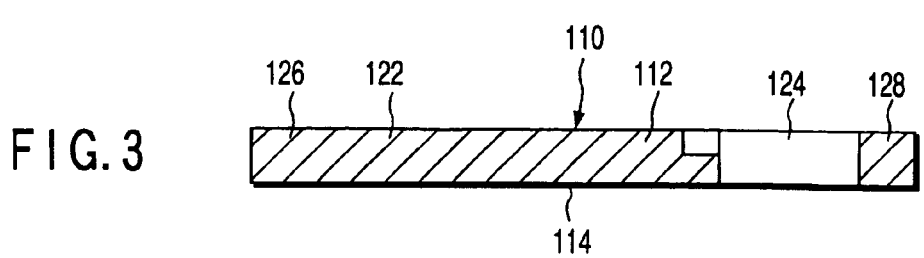
FIG. 3 is a sectional view of the mirror rocking member taken along line III—III of FIG. 2.

As shown in FIGS. 1 to 3, a mirror rocking member 100 comprises a movable plate 110 having a reflective surface, torsion bars 122, 124 as a pair of elastic members for rockably supporting the movable plate 110, and support members 126, 128 for supporting the torsion bars 122, 124. The torsion bars 122, 124 have rectangular sections, and symmetrically extend to opposite sides from the movable plate 110. Therefore, the movable plate 110 is rockably supported around a rocking axis passed through the torsion bars 122, 124 with respect to the support members 126, 128.

The movable plate 110 has a first portion 112 having the reflective surface, and a second portion 114 having an electric element, which constitutes a part of driving means for driving the mirror rocking member 100. The first portion 112 has a reflective-surface forming surface 116 with the reflective surface formed thereon, and side surfaces of the first portion 112 cross at right angles to the reflective-surface forming surface 116. The second portion 114 has an electric-element forming surface 118 with the electric element formed thereon, and side surfaces of the second portion 114 cross at right angles to the electric-element forming surface 118. The reflective-surface forming surface 116 has an area smaller than that of the electric-element forming surface 118.

The electric element of the driving means depends on a driving system of the mirror rocking member 100. The electric element comprises, for example, a driving coil extending along a peripheral edge of the movable plate 110 in an electromagnetic driving system, or a pair of driving electrodes extending over the substantially whole surface of the movable plate 110 in an electrostatic driving system. Moreover, the reflective surface may be the reflective-surface forming surface 116, or the surface of a reflective film formed on the reflective-surface forming surface 116.

As well shown in FIG. 2, the electric-element forming surface 118 has a rectangular shape or contour, and the reflective-surface forming surface 116 has an elliptical shape or contour. The elliptical reflective-surface forming surface 116 particularly preferably has a shape or contour substantially inscribed with the rectangular electric-element forming surface 118.

The movable plate 110, torsion bars 122, 124 and support members 126, 128 have the same thickness. Moreover, roundness (R) is applied to concave corner portions of connected portions of the torsion bars 122, 124 and movable plate 110 and the torsion bars 122, 124 and support members 126, 128 in order to prevent a stress from being concentrated.

The mirror rocking member 100 is monolithically formed from a single-crystal silicon substrate, for example, utilizing a semiconductor process. Single-crystal silicon has a high rigidity and little internal attenuation of a material, and is therefore suitable for the materials of the torsion bars 122, 124 for resonance driving and support members 126, 128 bonded to external members.

Figure 4:
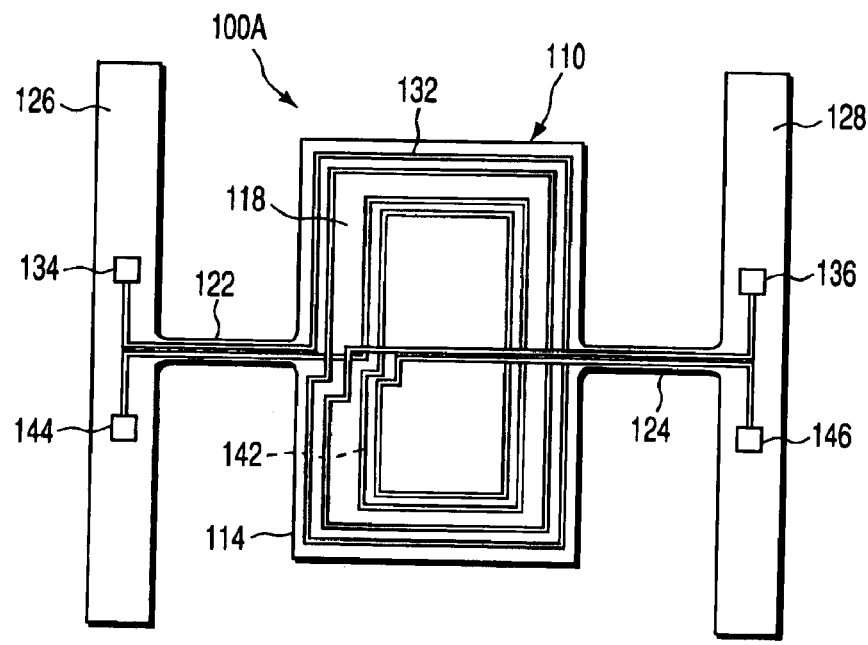
FIG. 4 is a plan view of the mirror rocking member, which includes a driving coil as an electric element for electromagnetic driving.
Figure 5:
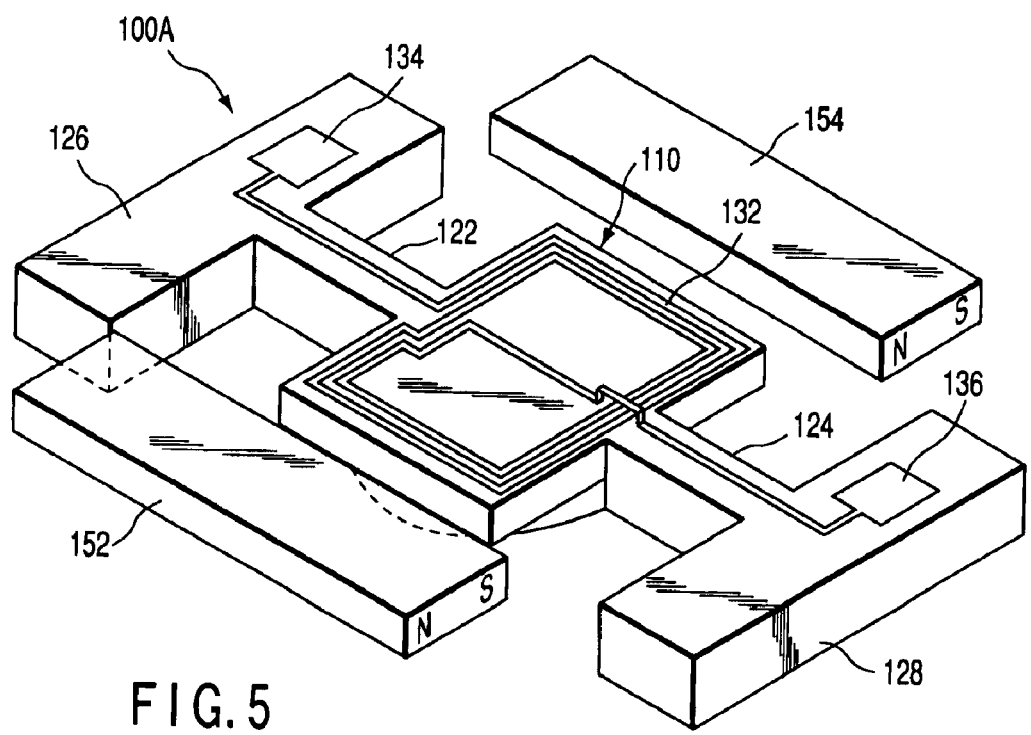
FIG. 5 is a perspective view of an electromagnetic optical deflector including the mirror rocking member shown in FIG. 4 and a pair of permanent magnets.

As described above, the electric element disposed on the movable plate 110 differs with a driving system of the mirror rocking member 100. A mirror rocking member 100A for an electromagnetic driving system is shown in FIG. 4. Moreover, an electromagnetic driving type of optical deflector using the mirror rocking member 100A is shown in FIG. 5. These drawings schematically show a layout of the driving coil as the electric element disposed on the movable plate 110, and an insulating film for protecting the driving coil, and the like are omitted from the drawings.

As shown in FIGS. 4 and 5, the mirror rocking member 100A includes a driving coil 132 disposed along the peripheral edge of the movable plate 110. One end of the driving coil 132 extends through the torsion bar 122, and is electrically connected to an electrode pad 134 disposed on the support member 126. The other end of the driving coil 132 extends over the portion disposed along the peripheral edge of the movable plate 110 through the torsion bar 124, and is electrically connected to an electrode pad 136 disposed on the support member 128.

Furthermore, as shown in FIG. 4, the movable plate 110 includes a velocity sensing coil 142 disposed on an inner periphery of the driving coil 132 (the velocity sensing coil 142 is omitted from FIG. 5). One end of the velocity sensing coil 142 extends through the torsion bar 122, and is electrically connected to an electrode pad 144 disposed on the support member 126. The other end of the velocity sensing coil 142 extends over the portion disposed along the peripheral edge of the movable plate 110 through the torsion bar 124, and is electrically connected to an electrode pad 146 disposed on the support member 128.

As shown in FIG. 5, the electromagnetic driving type of optical deflector includes the mirror rocking member 100A shown in FIG. 4, and a pair of permanent magnets 152, 154. The permanent magnets 152, 154 are disposed in the vicinity of opposite sides of the movable plate 110, and substantially in parallel to the rocking axis. The permanent magnets 152, 154 have the same magnetization direction, and this direction extends substantially in parallel to the electric-element forming surface of the movable plate 110 in a stationary state. The permanent magnets 152, 154 generate a magnetic field in a direction crossing at right angles to the rocking axis within the electric-element forming surface of the movable plate 110 with respect to the portions of the driving coil 132 disposed on the opposite sides of the movable plate 110. The driving coil 132 and permanent magnets 152, 154 cooperate with one another and constitute driving means.

When an alternating-current voltage is applied to two electrode pads 134, 136 on the support members 126, 128, an alternating current flows through the driving coil 132. The current flowing through the portion of the driving coil 132 in the vicinity of the permanent magnets 152, 154 undergoes a Lorentz force by an interaction with the magnetic field generated by the permanent magnets 152, 154. As a result, with the application of the alternating-current voltage in a plate thickness direction, the movable plate 110 undergoes couple of forces whose direction periodically changes. Therefore, the movable plate 110 rocks, that is, vibrates around the rocking axis, which extends in a longitudinal direction of two torsion bars 122, 124. As a result, the light beam reflected by the reflective surface disposed on the movable plate 110 is periodically deflected at a constant angle width.

Figure 6:
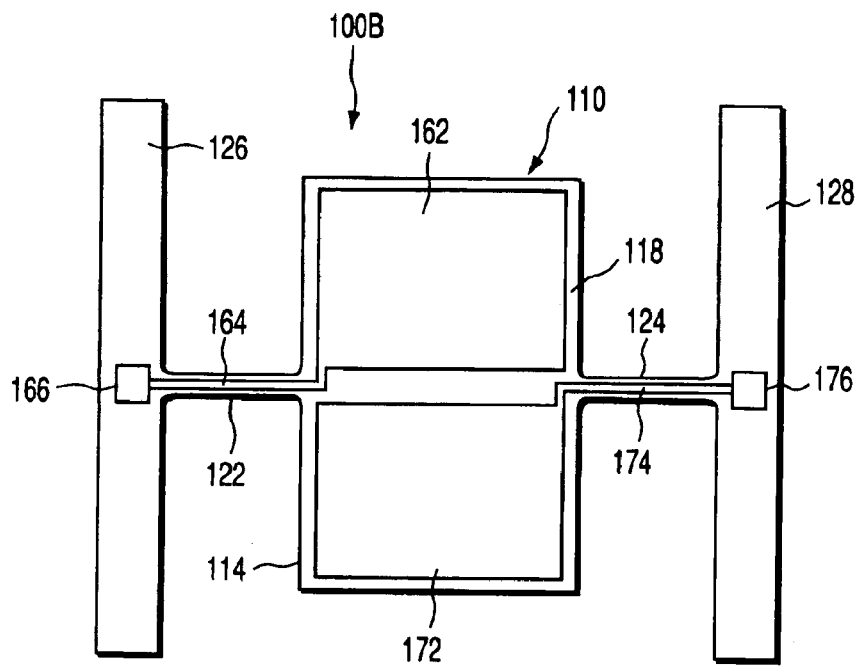
FIG. 6 is a plan view of the mirror rocking member including a driving electrode as the electric element for electrostatic driving.
Figure 7:
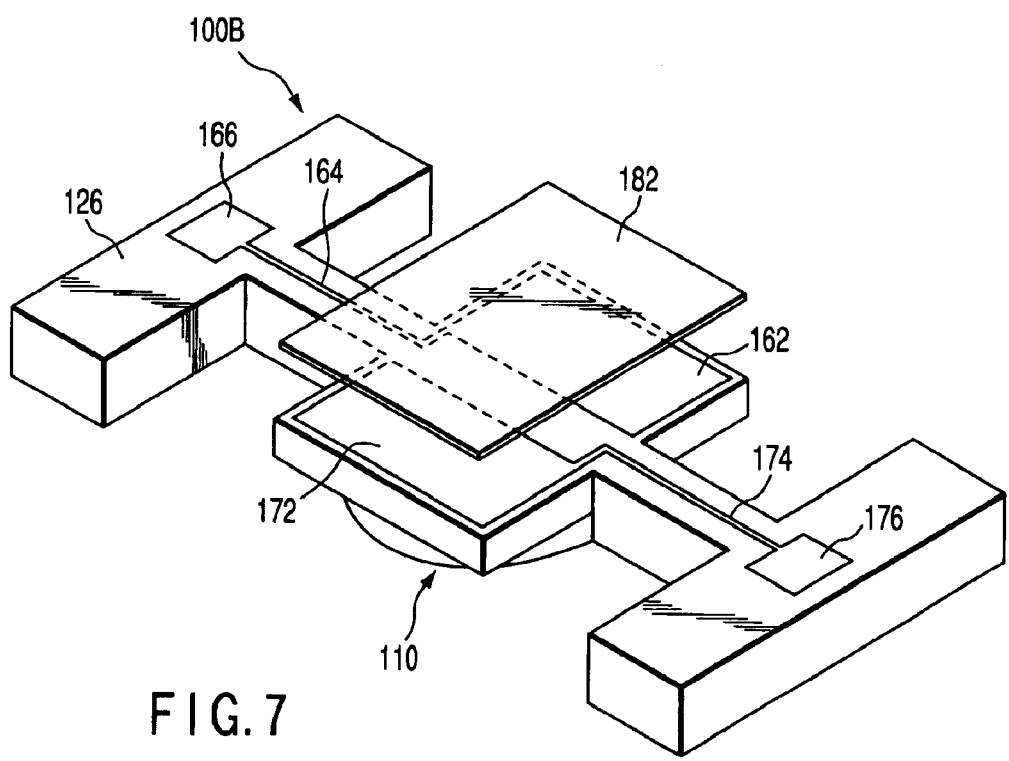
FIG. 7 is a perspective view of the optical deflector of the electrostatic driving type including the mirror rocking member shown in FIG. 6 and a fixed electrode.
Figure 8A:
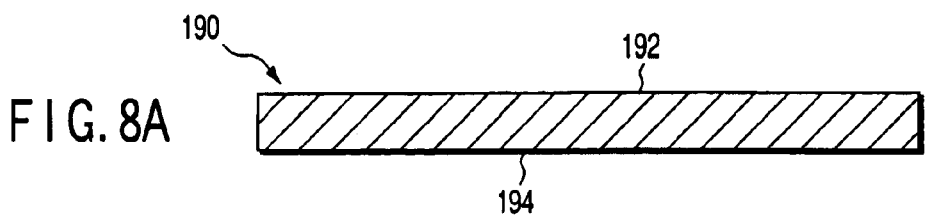
FIGS. 8A to 8D show a series of steps for preparing the mirror rocking member of FIG. 1, and each step is shown by a section of the mirror rocking member taken along line III—III of FIG. 2.
Figure 8B:
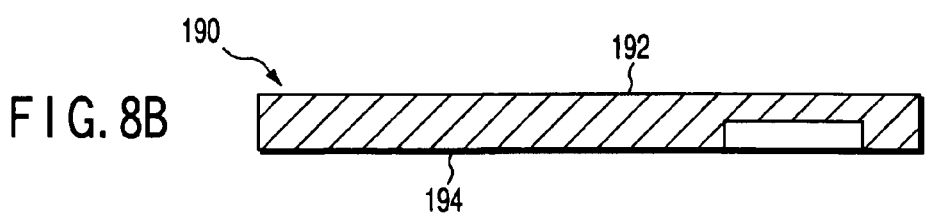
Figure 8C:
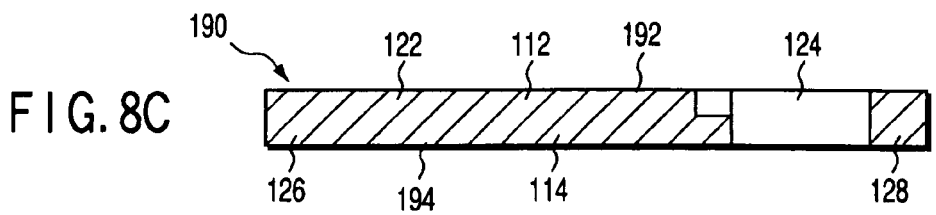
Figure 8D:
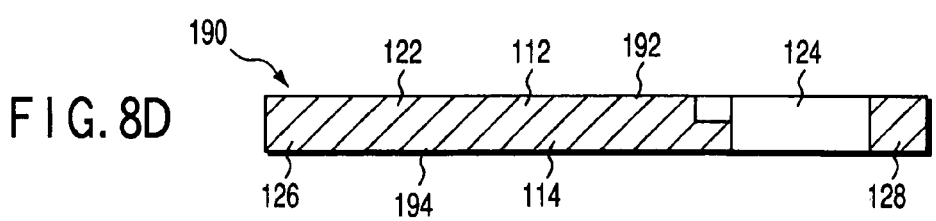

Moreover, a mirror rocking member 100B for the electrostatic driving system is shown in FIG. 6. Furthermore, the electrostatic driving type of optical deflector using the mirror rocking member 100B is shown in FIG. 7. These drawings schematically show the layout of a driving electrode as the electric element disposed on the movable plate 110, and the insulating film for protecting the driving electrode, and the like is omitted from the drawings.

As shown in FIGS. 6 and 7, the mirror rocking member 100B includes a pair of driving electrodes 162, 172. The driving electrodes 162, 172 have the same shape, are symmetrically disposed with respect to the rocking axis, and extend substantially over the whole electric-element forming surface 118. The driving electrode 162 is electrically connected to an electrode pad 166 disposed on the support member 126 via a wiring 164, which extends through the torsion bar 122. Moreover, the driving electrode 172 is electrically connected to an electrode pad 176 disposed on the support member 128 via a wiring 174, which extends through the torsion bar 124.

As shown in FIG. 7, the electrostatic driving type of optical deflector includes the mirror rocking member 100B shown in FIG. 6, and a fixed electrode 182 disposed opposite to the driving electrodes 162, 172 disposed on the movable plate 110. The fixed electrode 182 is fixed to a member (not shown), and supported in a constant direction. The driving electrodes 162, 172 cooperate with the fixed electrode 182 to constitute the driving means.

The fixed electrode 182 is kept, for example, at a ground potential, and a predetermined potential is alternately applied to the driving electrodes 162, 172 via the corresponding electrode pads 166, 176. The driving electrodes 162, 172 undergo an electrostatic attraction force in accordance with a potential difference from the fixed electrode 182. With the alternate application of the potential, the movable plate 110 undergoes the torque, as a result of the couple of forces, whose direction periodically changes with respect to the rocking axis. Therefore, the movable plate 110 rocks, that is, vibrates around the rocking axis, which extends in the longitudinal direction of two torsion bars 122, 124. As a result, the light beam reflected by the reflective surface disposed on the movable plate 110 is periodically deflected at a constant angle width.

In the electrostatic driving type of optical deflector shown in FIG. 7, the driving means comprises a pair of electrodes 162, 172 formed on the movable plate 110, and one electrode 182 disposed opposite to the electrodes. Conversely, the optical deflector may comprise one electrode formed on the movable plate 110, and a pair of electrodes disposed opposite to the plate.

The mirror rocking member 100 is prepared utilizing a semiconductor process. A manufacturing method of the mirror rocking member 100 will be described hereinafter with reference to FIGS. 8A to 8D. Respective steps shown in FIGS. 8A to 8D are shown by sections taken along line III—III of FIG. 2.

Step 1 (FIG. 8A): A single-crystal silicon substrate 190 having opposite surfaces polished is prepared as a start wafer. The electric element constituting a part of the driving means, such as the driving coil and driving electrode, is formed, for example, on a lower surface 194 (corresponding to the electric-element forming surface 118) of the single-crystal silicon substrate 190. The electric element is formed, for example, through steps of forming and patterning a metal thin film, and forming an insulating film by a photolithography technique.

Step 2 (FIG. 8B): The single-crystal silicon substrate 190 is etched at a predetermined depth from the lower surface 194 with the electric element formed thereon in shapes corresponding to those of the second portion 114 of the movable plate 110, torsion bars 122, 124 and support members 126, 128. The etching is performed by reactive ion etching (RIE) utilizing, for example, inductive coupling plasma (ICP) so that an etched side surface extends substantially vertically to upper and lower surfaces 192, 194 of the substrate. The etching depth is controlled, for example, by an etching time.

Step 3 (FIG. 8C): The single-crystal silicon substrate 190 is etched from the upper surface 192 in the shapes corresponding to those of the first portion 112 of the movable plate 110, torsion bars 122, 124 and support members 126, 128. The etching is also performed, for example, by ICP-RIE. A pattern of an etching mask needs to be accurately aligned with the pattern formed on the lower surface 194. As a result of this step, a structure including the movable plate 110, torsion bars 122, 124, and support members 126, 128 is formed. In the structure, the movable plate 110 is connected to the support members 126, 128 only by the torsion bars 122, 124. Moreover, the first portion 112 and second portion 114 of the movable plate 110 are formed by processing the single-crystal silicon substrate 190 in different shapes from the opposite surfaces by dry etching.

Step 4 (FIG. 8D): A reflective film is formed on a portion corresponding to the first portion 112 of the movable plate 110 with respect to the upper surface 192 of the single-crystal silicon substrate 190.

A large number of structures are usually arranged and manufactured in one wafer. Finally, the individual structures are cut/separated by dicing, and the mirror rocking member 100 shown in FIGS. 1 to 3 is obtained.

Since the mirror rocking member 100 is monolithically formed utilizing the semiconductor process in this manner, the subsequent assembling operation is unnecessary, and the member can inexpensively be mass-produced in ultra-small sizes. Moreover, a dimensional precision is very high, and therefore a dispersion of properties is remarkably little.

As described above, in the mirror rocking member 100, the reflective-surface forming surface 116 of the first portion 112 of the movable plate 110 has an elliptical shape or contour, and the electric-element forming surface 118 of the second portion 114 of the movable plate 110 has a rectangular shape or contour. In the particularly preferable movable plate 110, the reflective-surface forming surface 116 has an elliptical shape or contour substantially inscribed with the rectangular contour of the electric-element forming surface 118.

According to the characteristic shapes, the movable plate 110 of the mirror rocking member 100 secures a reflective surface having an actually necessary size, whereas a moment of inertia is reduced. This respect will be described hereinafter in detail.

A light beam having a circular section is usually slantly incident upon the reflective surface of the optical deflector. Therefore, a spot of the light beam formed on the reflective surface generally has an elliptical shape. Therefore, when only a function for reflecting the light beam is noted, the movable plate having the reflective surface does not have to be rectangular, and the elliptical shape is preferable.

Various properties of the rectangular and elliptical movable plates will be described hereinafter.

First, a difference of the moment of inertia between the rectangular movable plate and the elliptical movable plate is considered. In the following consideration, the thickness direction is ignored as a unit thickness, and a material density is set to ρ. A moment of inertia $I_r$ around a gravity center of the rectangular movable plate is represented by the following equation (1), assuming that a length of a long side of a rectangle is a, and a length of a short side thereof is b.

$$I_r = \frac{1}{12}\rho a^3 b \quad (1)$$

On the other hand, a moment of inertia $I_e$ around the gravity center of the elliptical movable plate is represented by the following equation (2), assuming that a length of a long axis of an ellipse is a, and a length of a short axis thereof is b.

$$I_e = \frac{\pi}{64}\rho a^3 b \quad (2)$$

Therefore, a ratio of the moments of inertia is represented by the following equation (3).

$$\frac{I_e}{I_r} = \frac{12\pi}{64} = 0.59 \quad (3)$$

It is seen from the equation (3) that the moment of inertia of the elliptical movable plate is about 60% of the moment of inertia of the rectangular movable plate. That is, when the rectangular shape is changed to the elliptical shape, the moment of inertia of the movable plate is reduced to about 60%. This has been described in the paragraphs of the related art.

Next, a difference of a driving force between the rectangular movable plate and the elliptical movable plate will be considered.

First, the difference of the driving force in the electrostatic driving system shown in FIG. 7 will be described. It is assumed in the following consideration that the movable plate is in a neutral position, a permittivity of air is ε, an interval between the electrodes is S, an applied voltage is V, and a whole area (a half of the area of the movable plate) of one side with respect to the rocking axis contributes as the electrode. A generated torque $T_r$ in the neutral position of the rectangular movable plate is represented by the following equation (4).

$$T_r = \frac{\varepsilon V^2 a^2 b}{16 S^2} \quad (4)$$

On the other hand, a generated torque $T_e$ in the neutral position of the elliptical movable plate is represented by the following equation (5).

$$T_e = \frac{\varepsilon V^2 a^2 b}{24 S^2} \quad (5)$$

Therefore, a torque ratio of both plates is represented by the following equation (6).

$$\frac{T_e}{T_r} = \frac{16}{24} = 0.667 \quad (6)$$

It is seen from the equation (6) that the driving torque of the elliptical movable plate is about 66.7% of the driving torque of the rectangular movable plate. That is, when the rectangular shape is changed to the elliptical shape, the driving torque of the movable plate is reduced to about 66.7%. Consequently, it can be said that the driving torque is also reduced with a decrease of the moment of inertia, and some of advantages brought about by the reduction of the moment of inertia are lost.

A value of (driving torque/moment of inertia) of the elliptical movable plate to a value of (driving torque/moment of inertia) of the rectangular movable plate is an index that indicates a general effect of driving efficiency improvement brought about by the change to the elliptical shape from the rectangular shape of the movable plate. When the value of (driving torque/moment of inertia) of the rectangular movable plate is 1, the value of (driving torque/moment of inertia) of the elliptical movable plate is 1.13.

The difference of the driving force in the electromagnetic driving system shown in FIG. 5 will next be described. In the following consideration, it is assumed that the driving coil is disposed on the peripheral edge of the movable plate. Assuming that a magnetic flux density is uniform, the driving torque is proportional to an area surrounded by the coil. The generated torque in the neutral position of the rectangular movable plate is represented by the following equation (7) using a proportional constant K.

$$T_r = Kab \quad (7)$$

The generated torque in the neutral position of the elliptical movable plate is represented by the following equation (8) using the proportional constant K.

$$T_e = K\pi \frac{ab}{4} \quad (8)$$

Therefore, the torque ratio of the plates is represented by the following equation (9).

$$\frac{T_e}{T_r} = \frac{\pi}{4} \approx 0.785 \quad (9)$$

It is seen from the equation (9) that the driving torque of the elliptical movable plate is about 78.5% of the driving torque of the rectangular movable plate. That is, when the rectangular shape is changed to the elliptical shape, the driving torque of the movable plate is reduced to about 78.5%.

Moreover, for the value of (driving torque/moment of inertia) as the index indicating the general effect of driving efficiency improvement by the change to the elliptical shape from the rectangular shape of the movable plate, when the value of (driving torque/moment of inertia) of the rectangular movable plate is 1, the value of (driving torque/moment of inertia) of the elliptical movable plate is 1.31.

This value is better than that of the electrostatic driving system. However, in the actual electromagnetic driving system, the magnetic flux density is not uniform, generally high in the vicinity of the movable plate, and decreases toward the inside. Therefore, it is expected that the driving torque of the elliptical movable plate is smaller than the value of the aforementioned calculation equation.

As described above, in the mirror rocking member 100 of the present embodiment, the movable plate 110 has the first portion 112 having the reflective surface, and the second portion 114 having the electric element. The reflective-surface forming surface 116 of the first portion 112 has an elliptical contour, and the electric-element forming surface 118 of the second portion 114 has a rectangular contour. Therefore, in the mirror rocking member 100, an advantage of reduction of the moment of inertia is obtained in the first portion 112 of the movable plate 110 by omitting an unnecessary portion, which does not contribute to reflection of the light beam similarly as the elliptical movable plate. In the second portion 114, the electric-element forming surface 118 having the same breadth as that of the rectangular movable plate is secured, and a disadvantage of reduction of the driving torque is not generated.

A moment of inertia I of the movable plate 110 is represented by the following equation (10), assuming that a moment of inertia with the (rectangular) contour similar to that of the second portion in a whole thickness is $I_r'$, and the thickness of the first portion 112 is x% of the thickness of the movable plate 110.

$$I = \left(0.6 \times \frac{x}{100} + \frac{100-x}{100}\right) I_r' = \frac{100 - 0.4x}{100} I_r' \quad (10)$$

A value of driving torque/moment of inertia of the movable plate 110 is the reciprocal of this value, and x that gives a value of 1.31 is about 59. Therefore, when the first portion 112 of the movable plate 110 has a thickness of about 60% of the whole thickness in the electromagnetic driving system, the same driving efficiency as that of the elliptical movable plate is obtained. In actual, a magnetic flux density distribution is not uniform, and it is expected that the value of driving torque/moment of inertia of the elliptical movable plate is smaller than 1.31. It is therefore expected that there is no difference from the elliptical movable plate with the thickness of the first portion 112 being about 50% of the thickness of the movable plate 110. The driving efficiency is further enhanced with increase of the thickness of the first portion 112. The driving efficiency of the movable plate 110 in the electrostatic driving system is higher than that in the electromagnetic driving system.

As seen from the above description, in the mirror rocking member 100 of the present embodiment, the movable plate 110 is constituted of the elliptical first portion 112 having the reflective surface and the rectangular second portion 114 having the electric element for driving. Therefore, the reflective surface having a size actually necessary for reflection of the light beam is maintained, whereas the reduction of the moment of inertia of the movable plate is achieved. The mirror rocking member provides an optical deflector that has a high driving efficiency.

The mirror rocking member 100 of the present embodiment can variously be modified within the scope of the present invention. The electric element constituting a part of the driving means is not limited to the elements shown in FIGS. 4 to 7, and the layout of the driving coil, the shape of the driving electrode, and the like may appropriately be changed. A support mode of the movable plate is not limited to a center support, and other support modes such as a cantilever support may be used. The elastic member is not limited to the torsion bar, and a flexible spring may be used. A rocking direction of the movable plate is not limited to one direction, and the plate may be rocked in two directions.

Moreover, in the manufacturing method, processing of an electric-element forming surface side and processing of a reflective-surface forming surface side may be performed in reverse orders. Furthermore, the start wafer is not limited to the single-crystal silicon substrate, and a silicon-on-insulator (SOI) substrate may be used. In use of the SOI substrate, a silicon oxide film as an intermediate insulating layer may be utilized as a stop layer of etching from the respective surfaces.

Furthermore, the manufacturing method of the mirror rocking member 100 is not limited to the method in which the semiconductor process is used. For example, as shown in FIG. 9, the mirror rocking member 100 may be prepared by bonding a structure 1100 including an elliptical movable plate 1110, torsion bars 1120, 1130, and support members 1140, 1150 to a structure 1200 including a rectangular movable plate 1210, torsion bars 1220, 1230, and support members 1240, 1250.

Second Embodiment

A second embodiment will next be described with reference to the drawings.

Figure 10:
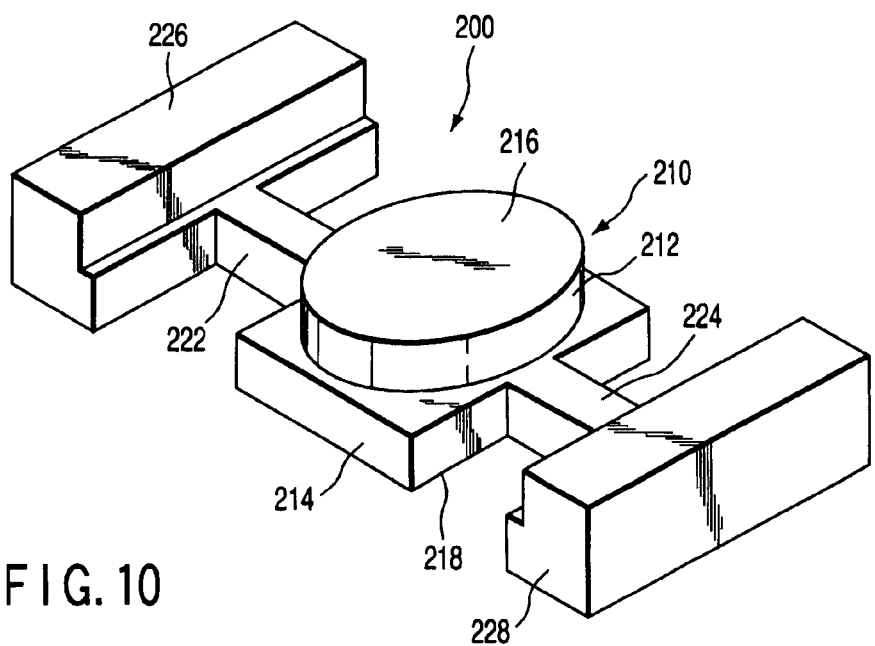
FIG. 10 is a perspective view of the mirror rocking member according to a second embodiment of the invention.
Figure 11:
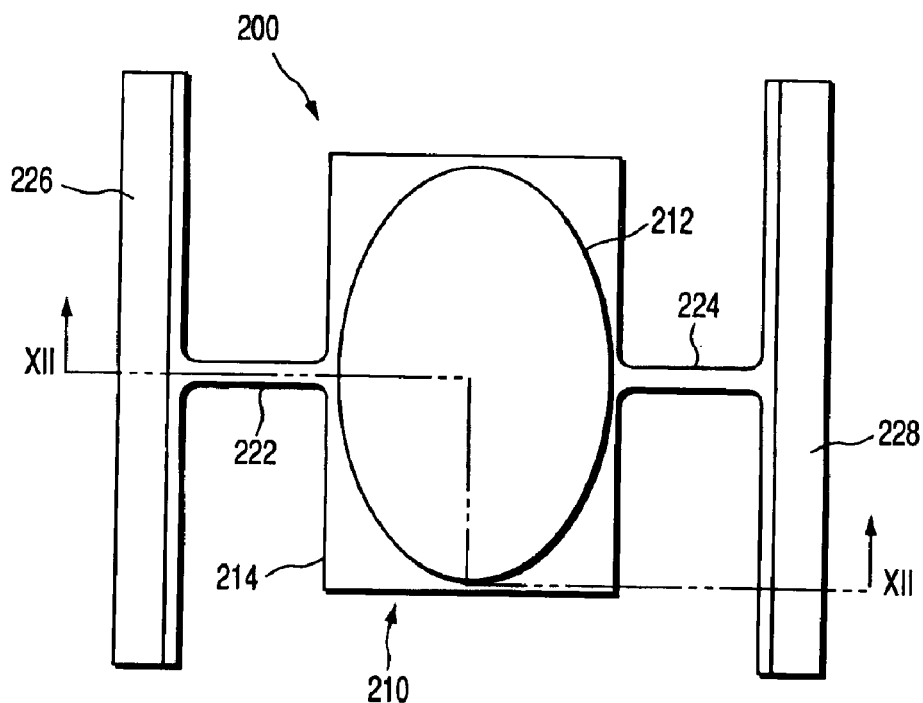
FIG. 11 is a plan view of the mirror rocking member shown in FIG. 10 as viewed from its reflective mirror.
Figure 12:
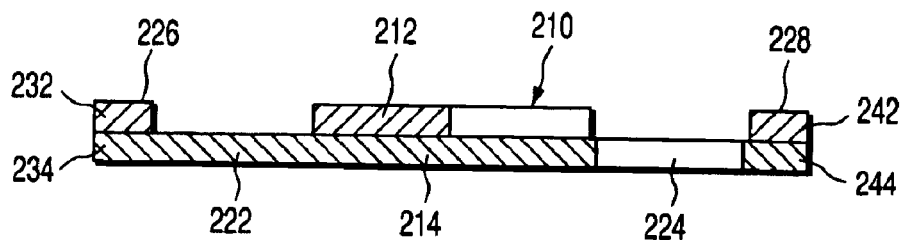
FIG. 12 is a sectional view of the mirror rocking member taken along line XII—XII of FIG. 11.

As shown in FIGS. 10 to 12, a mirror rocking member 200 comprises a movable plate 210 having the reflective surface, torsion bars 222, 224 as a pair of elastic members for rockably supporting the movable plate 210, and support members 226, 228 for supporting the torsion bars 222, 224. The torsion bars 222, 224 have rectangular sections, and symmetrically extend to opposite sides from the movable plate 210. Therefore, the movable plate 210 is rockably supported around the rocking axis passed through the torsion bars 222, 224 with respect to the support members 226, 228.

The movable plate 210 has a first portion 212 having the reflective surface, and a second portion 214 including an electric element constituting a part of the driving means for driving the mirror rocking member 200. As described in the first embodiment, the reflective surface may be a reflective-surface forming surface 216, or the surface of the reflective film formed on the reflective-surface forming surface 216. Moreover, as described in the first embodiment, the driving electric element such as the driving coil or driving electrode is formed on an electric-element forming surface 218.

The first portion 212 has the reflective-surface forming surface 216 with the reflective surface formed thereon, and a side surface of the first portion 212 crosses at right angles to the reflective-surface forming surface 216. The second portion 214 has the electric-element forming surface 218 with the electric element formed thereon, and side surfaces of the second portion 214 cross at right angles to the electric-element forming surface 218. The reflective surface forming surface 216 has an area smaller than that of the electric-element forming surface 218.

As well shown in FIG. 11, the electric-element forming surface 218 has a rectangular shape or contour, and the reflective-surface forming surface 216 has an elliptical shape or contour. The elliptical shape of the reflective-surface forming surface 216 is slightly smaller than an elliptical shape inscribed with the rectangular electric-element forming surface 218. Moreover, roundness (R) is applied to the concave corner portions of the connected portions of the torsion bars 222, 224 and movable plate 210 and those of the torsion bars 222, 224 and support members 226, 228 in order to prevent the stress from being concentrated.

As well shown in FIG. 12, the movable plate 210 and support members 226, 228 have the same thickness, and the torsion bars 222, 224 have a small thickness as compared with the movable plate 210 and support members 226, 228. In other words, the support members 226, 228 have respective first portions 232, 242 on a reflective surface side, and second portions 234, 244 on an electric element side. The second portion 214 of the movable plate 210, torsion bars 222, 224, and second portions 234, 244 of the support members 226, 228 have the same thickness.

The mirror rocking member 200 is monolithically formed from the silicon-on-insulator (SOI) substrate, for example, utilizing the semiconductor process. The torsion bars 222, 224 are formed on a silicon layer on one side of the intermediate insulating layer, that is, on the silicon layer on a side with the reflective surface formed thereon.

In the mirror rocking member 200, the first portion 212 of the movable plate 210 is smaller than the second portion 214. Therefore, as shown in FIG. 12, there is a step of the first and second portions 212 and 214, and the step is positioned in the vicinity of the torsion bars 222, 224. Similarly, the support members 226, 228 have steps of the first portions 232, 242 and second portions 234, 244, and these steps are positioned in the vicinity of the torsion bars 222, 224.

Figure 13A:
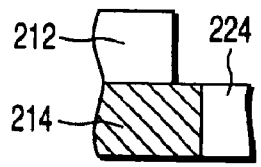
FIGS. 13A and 13B show a connected portion of the movable plate and elastic member shown in FIG. 12 in an enlarged manner.
Figure 13B:
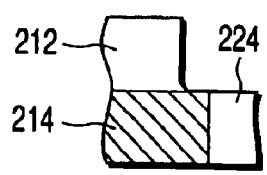
Figure 14A:
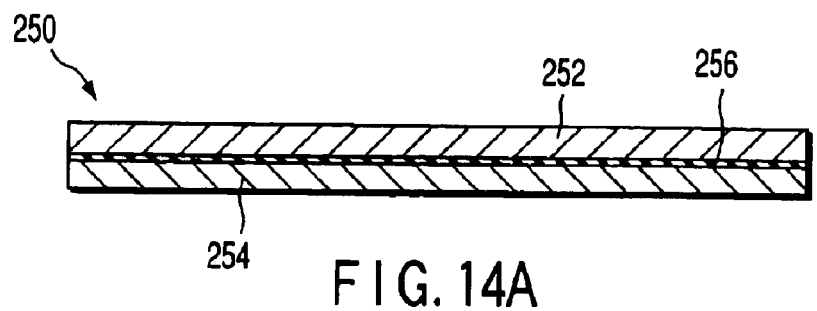
FIGS. 14A to 14D show a series of steps for preparing the mirror rocking member of FIG. 10, and each step is shown by a section of the mirror rocking member taken along line XII—XII of FIG. 11.
Figure 14B:
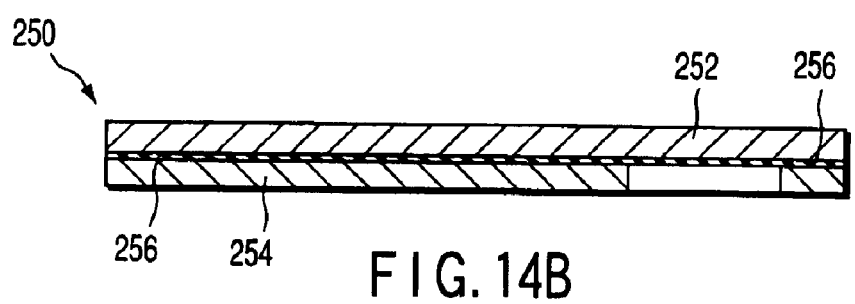
Figure 14C:
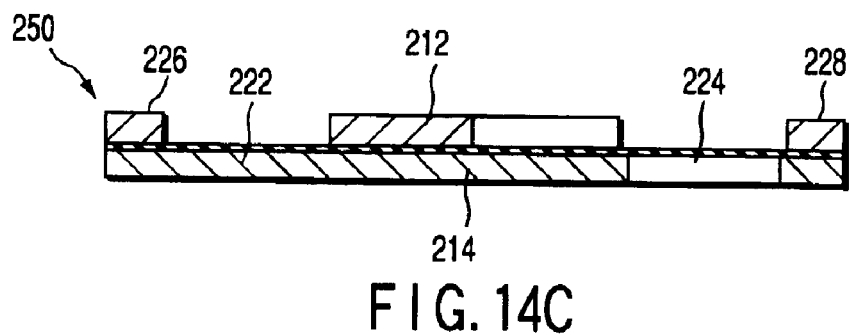
Figure 14D:
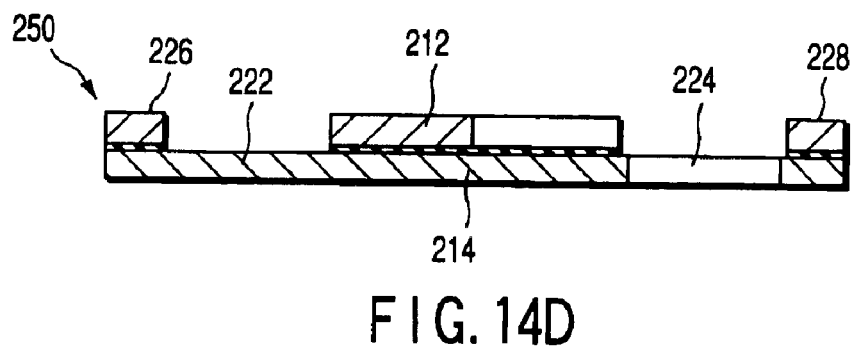

In the silicon processing by ICP-RIE, the etched side surface is formed substantially vertically to the surface of the wafer. Therefore, as shown in FIG. 13A, the step has a concave corner of substantially 90°. Stress concentration easily occurs in the concave corner of substantially 90°, and this may cause breakage during deformation of the torsion bar. Therefore, as shown in FIG. 13B, roundness (R) is preferably applied to the concave corner of the step. The application of the roundness (R) is not necessarily easy, but can be achieved, for example, by a process of changing a condition of silicon etching on the reflective-surface forming surface side and reducing only an etching rate in the vicinity of a vertical wall.

The mirror rocking member 200 is prepared utilizing the semiconductor process. The manufacturing method of the mirror rocking member 200 will be described hereinafter with reference to FIGS. 14A to 14D. The respective steps shown in FIGS. 14A to 14D are shown by the sections taken along line XII—XII of FIG. 11.

Step 1 (FIG. 14A): An SOI substrate 250 having opposite surfaces polished is prepared as the start wafer. The SOI substrate 250 has a first silicon layer 252 and second silicon layer 254, and both layers are bonded to each other via an intermediate insulating layer 256. In other words, the SOI substrate 250 comprises the first silicon layer 252, second silicon layer 254, and intermediate insulating layer 256 positioned between the silicon layers. The electric element constituting a part of the driving means, such as the driving coil and driving electrode, is formed on the second silicon layer 254. The electric element is formed, for example, through the steps of forming and patterning the metal thin film, and forming the insulating film by the photolithography technique.

Step 2 (FIG. 14B): The second silicon layer 254 is etched in the shapes corresponding to those of the second portion 214 of the movable plate 210, torsion bars 222, 224 and support members 226, 228, for example, by the ICP-RIE. The etching stops at the silicon oxide layer 256 as the intermediate insulating layer.

Step 3 (FIG. 14C): The first silicon layer 252 is etched in the shapes corresponding to those of the first portion 212 of the movable plate 210 and support members 226, 228, for example, by the ICP-RIE. The pattern of the etching mask needs to be accurately aligned with the pattern formed on the second silicon layer 254. However, the first portion 212 of the elliptical movable plate 210 is one size smaller than the elliptical shape inscribed with the second portion 214 of the rectangular movable plate 210, and a required precision is therefore lower than that of the first embodiment. The etching stops at the silicon oxide layer 256 as the intermediate insulating layer. Preferably, as shown in FIG. 13B, the roundness (R) is applied to the concave corner immediately before the etching stops.

Step 4 (FIG. 14D): An exposed portion of the silicon oxide layer 256 is etched and removed. As a result of the step, a structure including the movable plate 210, torsion bars 222, 224, and support members 226, 228 is formed. In the structure, the movable plate is connected to the support members 226, 228 only by the torsion bars 222, 224. The torsion bars 222, 224 are constituted of a part of the second silicon layer 256. The first and second portions 212, 214 of the movable plate 210 are formed by dry-etching and processing the first and second silicon layers 252, 254. Furthermore, the reflective film is formed on the portion of the first silicon layer 252 corresponding to the first portion 212 of the movable plate 210.

A large number of structures are usually arranged and manufactured in one wafer. Finally, the individual structures are cut/separated by dicing, and the mirror rocking member 200 shown in FIGS. 10 to 12 is obtained.

Since the mirror rocking member 200 is monolithically formed utilizing the semiconductor process in this manner, the subsequent assembling operation is unnecessary, and the member can inexpensively be mass-produced in ultra-small sizes. Moreover, the dimensional precision is very high, and therefore the dispersion of properties is remarkably little.

Also in the mirror rocking member 200 of the second embodiment, the movable plate 210 has the elliptical first portion 212 having the reflective surface, and the rectangular second portion 214 having the driving electric element. Similarly as the first embodiment, the reflective surface having a size actually necessary for the reflection of the light beam is maintained, whereas the moment of inertia of the movable plate is reduced.

The mirror rocking member 200 of the second embodiment can variously be modified within the scope of the present invention. The support mode of the electric element and movable plate, the function of the elastic member, and the like may be modified similarly as the first embodiment.

Moreover, for the manufacturing method, the single-crystal silicon substrate may be used as the start wafer, and the torsion bar thinner than the movable plate or the support member may be formed by controlling the etching depth with time.

Figure 15:
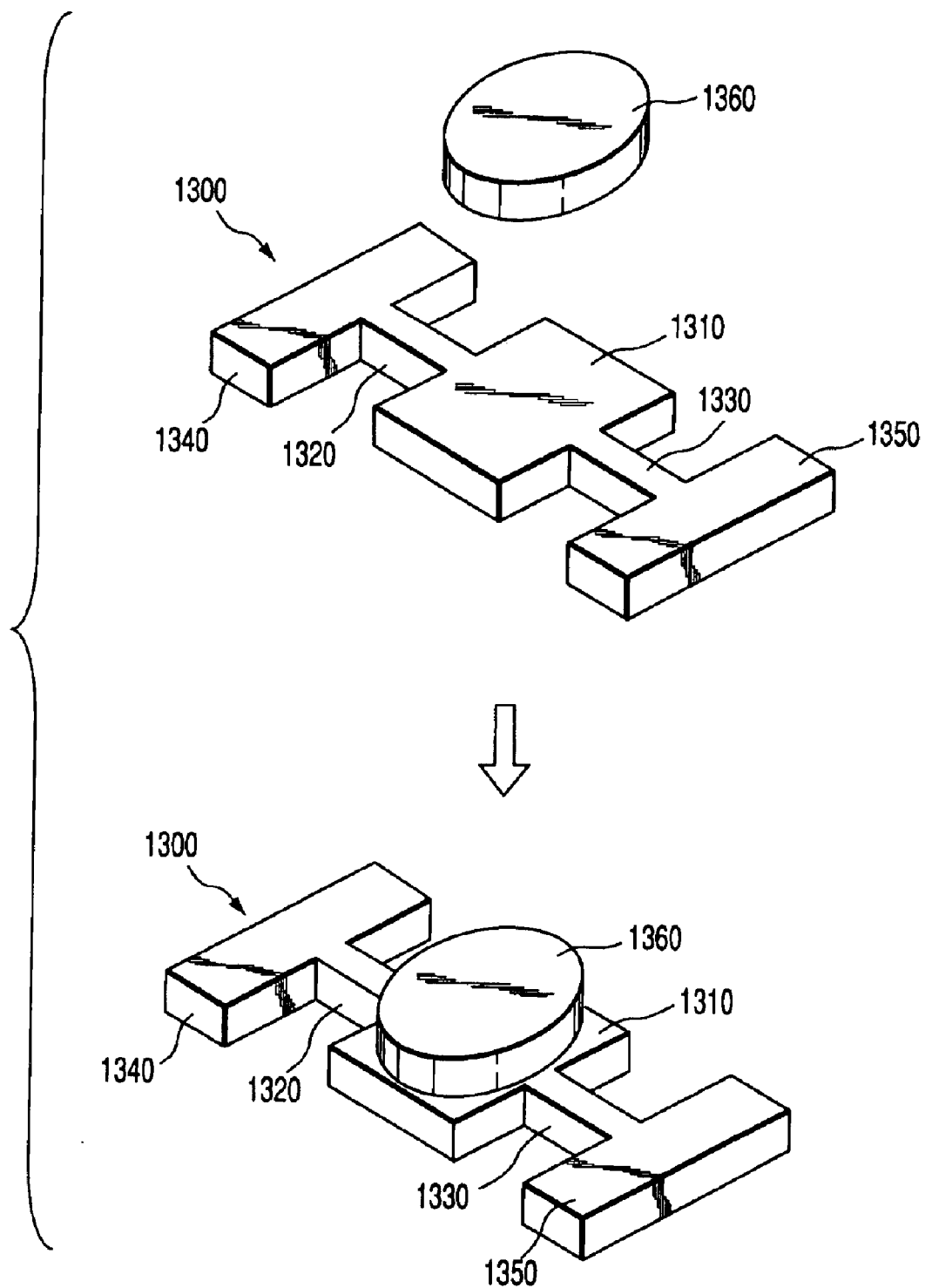
FIG. 15 shows another method for preparing the mirror rocking member of FIG. 11.

Furthermore, the manufacturing method of the mirror rocking member 200 is not limited to the method in which the semiconductor process is used. For example, as shown in FIG. 15, the mirror rocking member 200 may be prepared by bonding an elliptical mirror member 1360 having the reflective surface to a structure 1300 including a rectangular movable plate 1310, torsion bars 1320, 1330, and support members 1340, 1350.

Third Embodiment

A third embodiment will next be described with reference to the drawings.

As shown in FIGS. 16 and 17, a mirror rocking member 300 is a structure similar to the mirror rocking member 200 of the second embodiment, and comprises a movable plate 310 having the reflective surface, torsion bars 322, 324 as a pair of elastic members for rockably supporting the movable plate 310, and support members 326, 328 for supporting the torsion bars 322, 324. The torsion bars 322, 324 have rectangular sections, and symmetrically extend to opposite sides from the movable plate 310.

The movable plate 310 has a first portion 312 having the reflective surface, and a second portion 314 including an electric element constituting a part of the driving means for driving the mirror rocking member 300. The first portion 312 has a reflective-surface forming surface 316 with the reflective surface formed thereon, and side surfaces of the first portion 312 are inclined with respect to the reflective-surface forming surface 316. The second portion 314 has an electric-element forming surface 318 with the electric element formed thereon, and side surfaces of the second portion 314 cross at right angles to the electric-element forming surface 318.

The electric-element forming surface 318 has a rectangular shape, the reflective-surface forming surface 316 has a dodecagon shape, and accordingly a bottom surface of the first portion 312 (contour of boundary with the second portion 314) also has a dodecagon shape. The dodecagon shape of the first portion 312 is one size larger than the dodecagon shape of the reflective-surface forming surface 316, and slightly smaller than the elliptical shape inscribed with the rectangular electric-element forming surface 318.

Moreover, the support members 326, 328 have first portions 332, 342 on the reflective surface side, and second portions 334, 344 on the electric element side, respectively, and the first portions 332, 342 have inclined side surfaces.

The mirror rocking member 300 is monolithically formed from the silicon-on-insulator (SOI) substrate, for example, utilizing the semiconductor process similarly as the second embodiment. Additionally, the first portion 312 of the movable plate 310, and the first portions 332, 342 and second portions 334, 344 of the support members 326, 328 are formed by subjecting the silicon layer on one side of the intermediate insulating layer to wet etching. That is, the first portion 312 of the movable plate 310 is formed by wet-etching/processing the silicon layer of the SOI substrate, and the second portion 314 of the movable plate 310 is formed by dry-etching/processing the silicon layer of the SOI substrate. The other steps are similar to those of the second embodiment.

Single-crystal silicon having a (100) plane orientation is used in silicon as materials of the first portion 312 of the movable plate 310 and first portions 332, 342 of the support members 326, 328. A rectangular mask of silicon oxide, silicon nitride, or the like is formed on the surface of single-crystal silicon, wet etching is performed with alkaline etchant such as TMAH and KOH, and a (111) plane appears as the inclined surface on an etched side surface while the etching is proceeding. Additionally, the etching of a plane fast in etching rate proceeds in higher dimensions with respect to each corner of the rectangular mask, and a (311) plane or the like appears.

As a result of the wet etching, as shown in FIGS. 16 and 17, the first portion 312 of the movable plate 310 having the inclined side surface and the first portions 332, 342 of the support members 326, 328 having the inclined side surfaces are formed.

Also in the third embodiment, for the movable plate 310, as shown in FIG. 18A, there is a step of the first and second portions 312 and 314 in the vicinity of the torsion bars 322, 324. Similarly, the support members 326, 328 have the steps of the first portions 332, 342 and second portions 334, 344 in the vicinity of the torsion bars 322, 324. Since the step has a concave corner with an obtuse angle, the stress concentration does not easily occur. However, as shown in FIG. 18B, the roundness (R) is preferably applied to the corner. The application of the roundness (R) is not necessarily easy, but can be achieved to some degree, for example, by adding an additive to the etchant substantially at the end of the wet etching step of silicon, or using another etchant or changing the step otherwise, so that etching properties are changed.

Also in the mirror rocking member 300 of the third embodiment, since the movable plate 310 is constituted of the elliptical first portion 312 having the reflective surface, and the rectangular second portion 314 including the driving electric element. Therefore, similarly as the first and second embodiments, the reflective surface having a size actually necessary for the reflection of the light beam is maintained, whereas the reduction of the moment of inertia of the movable plate is achieved. This can provide the optical deflector having a high driving efficiency.

Moreover, for the mirror rocking member 300, since the first portion 312 of the movable plate 310 and the first portions 332, 342 of the support members 326, 328 are formed by the wet etching, a processing cost is reduced as compared with the first and second embodiments.

The mirror rocking member 300 of the third embodiment can variously be modified within the scope of the present invention. The support mode of the electric element and movable plate, the function of the elastic member, and the like may be modified similarly as the first embodiment. Moreover, the manufacturing method in which the semiconductor process is not used can also be applied, but there is no special advantage from the reflective-surface forming surface formed in the dodecagon shape.

Fourth Embodiment

A fourth embodiment will next be described with reference to the drawings.

Figure 19:
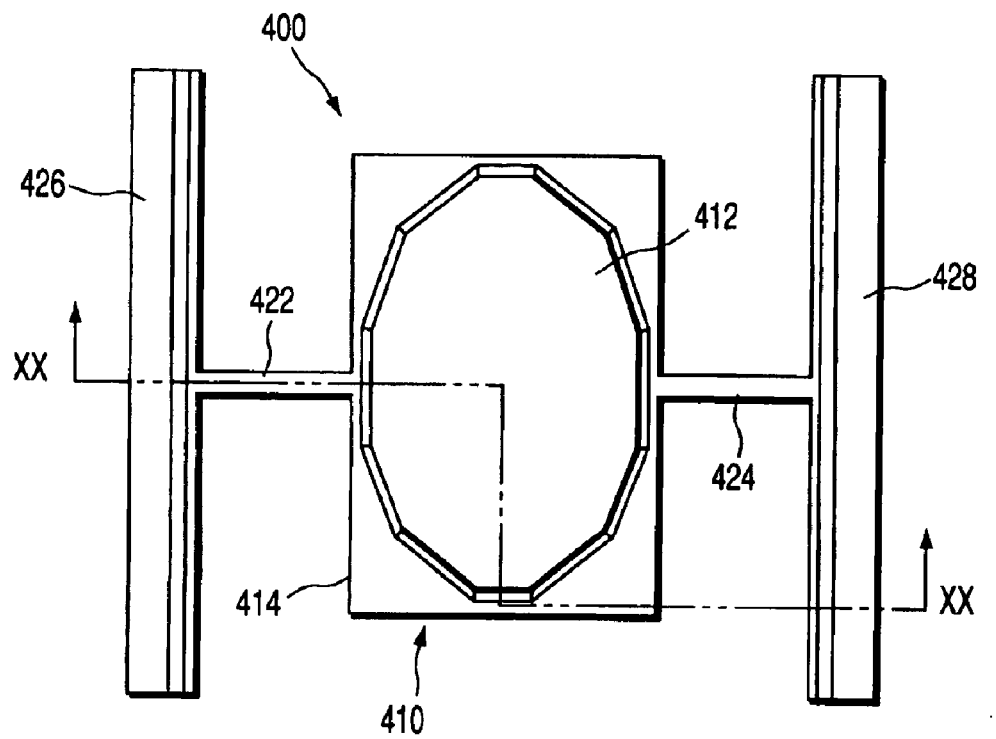
FIG. 19 is a plan view of the mirror rocking member according to a fourth embodiment of the invention as viewed from its reflective mirror.
Figure 20:
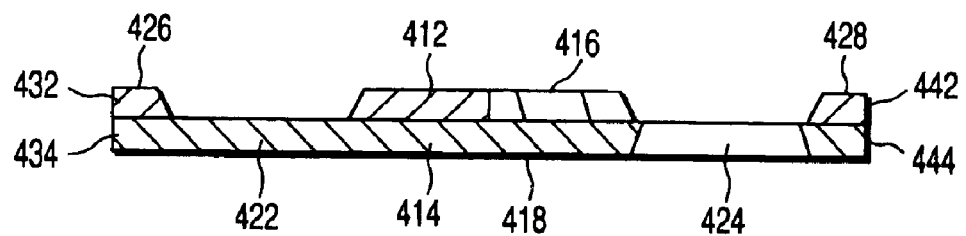
FIG. 20 is a sectional view of the mirror rocking member taken along line XX—XX of FIG. 19.
Figure 25A:
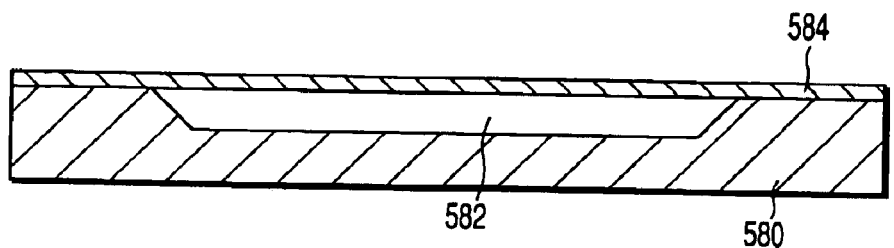
FIGS. 25A to 25D show a series of steps for preparing the mirror rocking member of FIG. 22, and each step is shown by a section of the mirror rocking member taken along line XXIII—XXIII of FIG. 22.
Figure 25B:
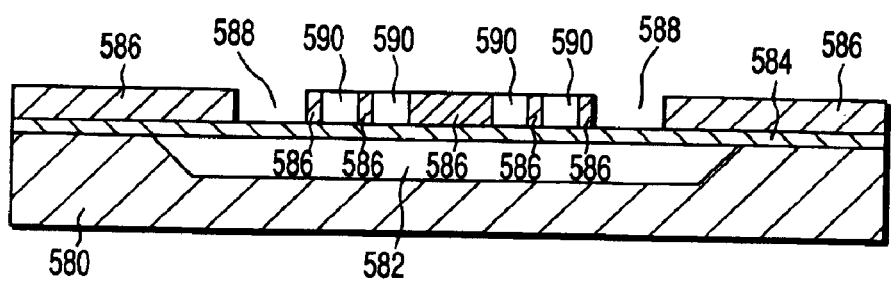
Figure 25C:
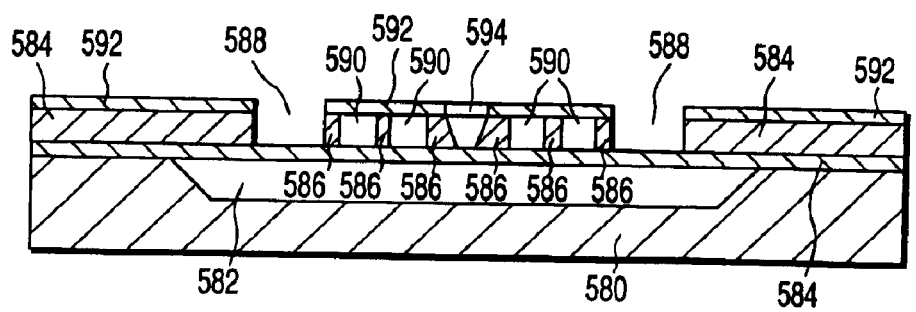
Figure 25D:
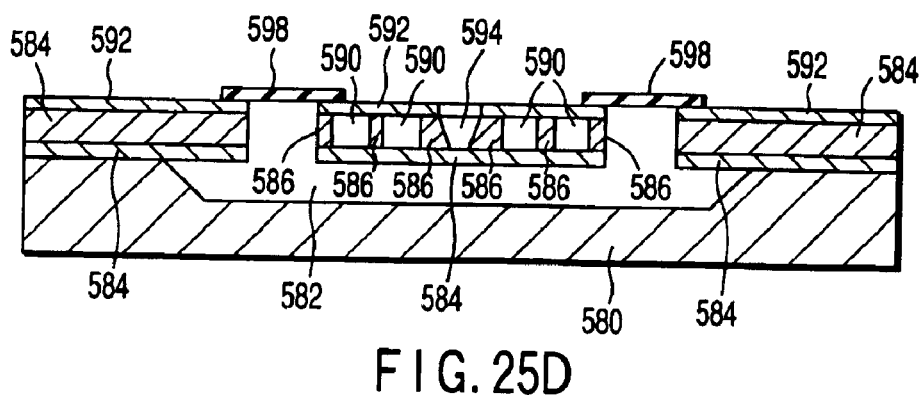

As shown in FIGS. 19 to 21, a mirror rocking member 400 is a structure similar to the mirror rocking member 300 of the third embodiment, and comprises a movable plate 410 having the reflective surface, torsion bars 422, 424 as a pair of elastic members for rockably supporting the movable plate 410, and support members 426, 428 for supporting the torsion bars 422, 424. The torsion bars 422, 424 have trapezoidal sections, and symmetrically extend to opposite sides from the movable plate 410.

The movable plate 410 has a first portion 412 having the reflective surface, and a second portion 414 including the electric element constituting a part of the driving means for driving the mirror rocking member 400. The first portion 412 has a reflective-surface forming surface 416 with the reflective surface formed thereon, and side surfaces of the first portion 412 are inclined with respect to the reflective-surface forming surface 416. The second portion 414 has an electric-element forming surface 418 with the electric element formed thereon, and side surfaces of the second portion 414 are inclined with respect to the electric-element forming surface 418.

The electric-element forming surface 418 has a rectangular shape, the reflective-surface forming surface 416 has a dodecagon shape, and accordingly the bottom surface of the first portion 412 (contour of boundary with the second portion 414) also has a dodecagon shape. The dodecagon shape of the bottom surface of the first portion 412 is one size larger than the dodecagon shape of the reflective-surface forming surface 416, and slightly smaller than the elliptical shape inscribed with the rectangular electric-element forming surface 418.

Moreover, the support members 426, 428 have first portions 432, 442 on the reflective surface side, and second portions 434, 444 on the electric element side, respectively, and the first portions 432, 442 and second portions 434, 444 have inclined side surfaces.

The mirror rocking member 400 is monolithically formed from the SOI substrate, for example, utilizing the semiconductor process similarly as the second embodiment. Additionally, two silicon layers of the SOI substrate for use are both formed of single-crystal silicon having a (100) plane orientation. The movable plate 410, torsion bars 422, 424, and support members 426, 428 are all formed by wet-etching/processing silicon. That is, the first and second portions 412, 414 of the movable plate 410 are both formed by wet-etching/processing the silicon layer of the SOI substrate.

The wet etching proceeds as described in the third embodiment. A pattern called a compensation pattern is formed beforehand in the etching mask in the processing of the rectangular second portion 414 of the movable plate 410, and the corner is prevented from being fast etched like the first portion 412 on the reflective surface side of the movable plate 410, so that the second portion 414 of the movable plate 410 is formed to have a right-angled portion.

As a result of use of the wet etching, as shown in FIGS. 19 to 21, the mirror rocking member 400 is formed which comprises the movable plate 410 having the inclined side surface, torsion bars 422, 424 having trapezoidal sections, and support members 426, 428 having the inclined side surfaces.

Also in the mirror rocking member 400 of the fourth embodiment, similarly as the first and second embodiments, the reflective surface having a size actually necessary for the reflection of the light beam is maintained, whereas the reduction of the moment of inertia of the movable plate is achieved. This can provide the optical deflector having the high driving efficiency.

Moreover, for the mirror rocking member 400, since silicon for forming the movable plate 410, torsion bars 422, 424, and support members 426, 428 are processed by the wet etching, the processing cost is further reduced as compared with the third embodiment.

Fifth Embodiment

A fifth embodiment will next be described with reference to the drawings.

As shown in FIGS. 22 and 23, a mirror rocking member 500 comprises a movable plate 510 having a reflective surface 508, torsion bars 522, 524 as a pair of elastic members for rockably supporting the movable plate 510, and support members 526, 528 for supporting the torsion bars 522, 524. The torsion bars 522, 524 symmetrically extend to opposite sides from the movable plate 510.

The movable plate 510 has a reflective-surface forming surface 516 with the reflective surface 508 formed therein, an electric-element forming surface 518 with an electric element formed thereon, and a large number of hollows 532 formed inside the movable plate 510. The movable plate 510 preferably has a rib structure for reinforcing rigidity. For example, as shown in FIG. 22, the rib structure comprises lattice walls 534 extending in a lattice shape to define the rectangular hollows 532, but may be a honeycomb structure for defining the hollow 532 in a hexagonal shape. The lattice wall 534 has a large number of vent holes or slits 536, and the respective hollows 532 are connected to an external space via the slits 536. The connection of the hollows 532 to the external space suppresses deformation of the reflective surface, which would be caused by a difference of temperature between the external space and the hollows 532 without the connection.

The optical deflector shown in FIG. 22 is of an electrostatic driving type, and electric element disposed on the movable plate 510 comprises a pair of driving electrodes formed on the electric-element forming surface 518 (not shown in FIG. 22). The electrodes cooperate with a fixed electrode 550 disposed opposite to the driving electrodes to constitute the driving means for driving the mirror rocking member 500. The driving electrodes formed on the electric-element forming surface 518 are electrically connected to wirings 546, 548 passed through the torsion bars 522, 524 via contact holes 542, 544. A driving voltage is appropriately applied to the driving electrodes from an external apparatus (not shown) via the wirings 546, 548.

A sectional structure of the movable plate 510 and structures of the contact holes 542, 544 will next be described with reference to FIG. 24.

As shown in FIG. 24, the movable plate 510 has three single-crystal silicon layers 562, 564, 566, and these layers are electrically insulated from one another by thermal oxide films 568, 570 each having a thickness, for example, of about 0.1 $\mu$m. The lowermost single-crystal silicon layer 562 is of silicon (FZ-Si) of an FZ type high in resistivity, and has a thickness, for example, of about 1 $\mu$m.

The intermediate single-crystal silicon layer 564 is, for example, of silicon (CZ-Si) of a CZ type, and has a thickness of about 8 $\mu$m. The single-crystal silicon layer 564 has a plurality of holes formed by selective removal, and these holes constitute the hollows 532.

The uppermost single-crystal silicon layer 566 is, for example, of CZ-Si, and has a thickness of about 1 $\mu$m. The single-crystal silicon layer 566 covers holes for defining the hollows 532 formed in the single-crystal silicon layer 564.

Moreover, the intermediate and upper single-crystal silicon layers 564 and 566 have openings which are formed in portions corresponding to the contact holes 542, 544 and which have truncated pyramid shapes with inclined side surfaces.

The surfaces of the upper single-crystal silicon layer 566 and contact holes 542, 544, excluding electric connected portions to the lower single-crystal silicon layer 562, are covered with an insulating film 572. A film of a metal such as Al is formed and patterned, and thereby the wirings 546, 548 electrically connected to the lower single-crystal silicon layer 562 are formed via the contact holes 542, 544 on the surface of the insulating film 572.

The lower single-crystal silicon layer 562, of FZ-Si, has a high resistance, and a potential difference applied between two contact holes 542, 544 can be maintained. Therefore, the single-crystal silicon layer 562 is a physically continuous material, but substantially functions similarly as the pair of driving electrodes 162, 172 electrically separated from each other as described in the first embodiment with reference to FIG. 7.

The manufacturing method of the mirror rocking member 500 will next be described with reference to FIGS. 25A to 25D. The respective steps shown in FIGS. 25A to 25D are shown by sections taken along line XXIII—XXIII of FIG. 22.

Step 1 (FIG. 25A): A support wafer 580 as a silicon wafer having a (100) plane orientation is prepared, and a gap 582 having a depth, for example, of about 80 $\mu$m is formed in an upper surface of the wafer. The structure is bonded to an FZ-Si wafer 584, which is to form the lower single-crystal silicon layer 562. The thickness of the bonded FZ-Si wafer 584 is reduced and set to about 1 $\mu$m by polishing, etching, and the like.

Step 2 (FIG. 25B): A CZ-Si wafer 586 forming the intermediate single-crystal silicon layer 564 is prepared, and a thermal oxide film (not shown) having a width, for example, of 0.1 $\mu$m and forming the thermal oxide film 568 is formed on the wafer. The CZ-Si wafer 586 is bonded to the FZ-Si wafer 584, and the thickness of the bonded wafer is reduced and set to about 8 $\mu$m by polishing, etching, and the like. Thereafter, a groove 588 defining the contour of the movable plate 510, and a plurality of holes 590 defining the hollows 532 are formed by ICP-RIE, and the like. In this case, cutouts as the slits 536 for connecting the hollows 532 to the external space as described above are also formed in partition walls for partitioning the holes 590.

Step 3 (FIG. 25C): A CZ-Si wafer 592 forming the upper single-crystal silicon layer 566 is prepared, and the thermal oxide film (not shown) having a width, for example, of 0.1 $\mu$m and forming the thermal oxide film 570 is formed on the wafer. The CZ-Si wafer 592 is bonded to the FZ-Si wafer 586, and the thickness of the bonded wafer is reduced and set to about 1 $\mu$m by polishing, etching, and the like. Thereafter, the CZ-Si wafer 592 is etched in the shape of the movable plate 510 by ICP-RIE, and the like. Furthermore, an opening 594 having a truncated pyramid shape and extending through the CZ-Si wafers 586 and 592 is formed in a portion forming the contact hole by wet etching using TMAH, and the like.

Step 4 (FIG. 25D): A torsion bar 598 extending over the CZ-Si wafer 592 separated by the groove 588 is formed of silicon nitride, polyimide, and the like. Furthermore, a wiring electrically connected to the FZ-Si wafer 584 via the opening having the truncated pyramid shape is formed of Al, and the like. For example, the wiring is formed to have a large area on the movable plate, and the corresponding portion may function as the reflective surface. Alternatively, the reflective surface may be constituted of a polished silicon surface. Finally, isotropic silicon etching is performed to remove the FZ-Si wafer 584 exposed as the bottom surface of the groove 588, and the mirror rocking member 500 is obtained. In the structure, the support wafer 580 is set to a ground potential, so that the bottom surface of the gap 582 of the support wafer 580 may function as the fixed electrode 550.

Since the movable plate 510 has the hollows 532 formed inside the plate of the mirror rocking member 500 of the fifth embodiment, the reduction of the moment of inertia of the movable plate is achieved. According to a rough estimate of the rib structure formed as the honeycomb structure, the moment of inertia can be reduced to about a half of the moment of inertia of the rectangular movable plate having a solid structure. Of course, the moment of inertias of the reflective-surface forming surface 516 and electric-element forming surface 518 of the movable plate 510 do not decrease as compared with the rectangular movable plate having the solid structure. Therefore, the size of the reflective surface and the driving torque are maintained in the mirror rocking member 500, whereas the reduction of the moment of inertia of the movable plate is achieved.

The mirror rocking member 500 of the fifth embodiment can variously be modified within the scope of the present invention. For example, in the fifth embodiment, the torsion bars 522, 524 as the elastic members are formed of the thin films formed on the CZ-Si wafer 592 as the uppermost layer, but may be formed of the portion of the CZ-Si wafer 592 left during etching of the CZ-Si wafer 592 as the uppermost layer. Furthermore, if necessary, the bars may be formed by a combination of the CZ-Si wafer 586 as the intermediate layer and the FZ-Si wafer 584 as the lowermost layer.

Figure 26:
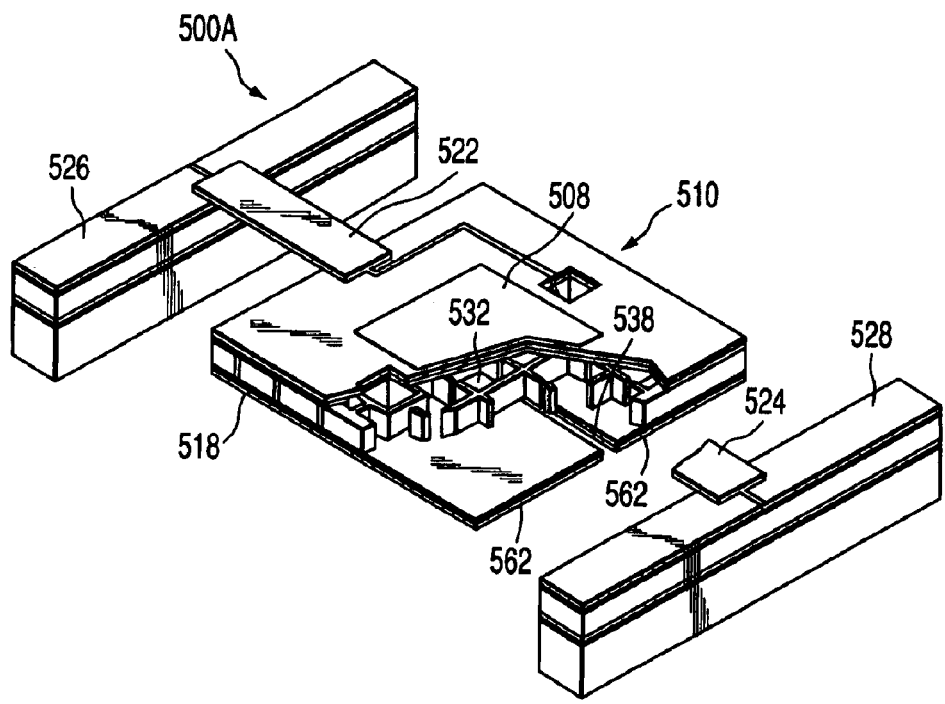
FIG. 26 shows the optical deflector using the mirror rocking member according to a modification of the fifth embodiment.

FIG. 26 shows an optical deflector, which uses a mirror rocking member 500A as a modification example of the fifth embodiment. In the mirror rocking member 500A, as shown in FIG. 26, the lower single-crystal silicon layer 562 of the movable plate 510 is a layer of silicon (CZ-Si) of a CZ type having a low resistivity, and is spatially separated by slits 538.

In the optical deflector shown in FIG. 22, the movable plate 510 is driven by a potential difference from the fixed electrode 550 disposed opposite to the movable plate. However, the lower single-crystal silicon layer 562 of the movable plate 510 functioning as the driving electrode is of FZ-Si, which is high in resistivity. Therefore, the portion having a large potential difference with respect to the fixed electrode 550 is limited to a portion in the vicinity of the contact holes 542, 544, and a portion relatively remote from the portion having the large difference hardly contributes to a driving force.

As shown in FIG. 26, in the optical deflector using the mirror rocking member 500A, the lower single-crystal silicon layer 562 of the movable plate 510 functioning as the driving electrode is of CZ-Si, which has low resistivity. One side of the single-crystal silicon layer 562 separated by the slit 538 entirely has the same potential, and contributes to the driving force of the movable plate 510, and the driving force is remarkably enhanced.

Moreover, it is known that a mechanical strength of silicon increases with a higher concentration of oxygen between lattices included in silicon (authored by Takao Abe, Silicon Crystal and Doping (Maruzen Co., Ltd.) P32). CZ-Si has a remarkably high oxygen concentration between the lattices as compared with FZ-Si. Therefore, the mirror rocking member 500A has a high resistance to shock as compared with the mirror rocking member 500 shown in FIG. 22.

Figure 27:
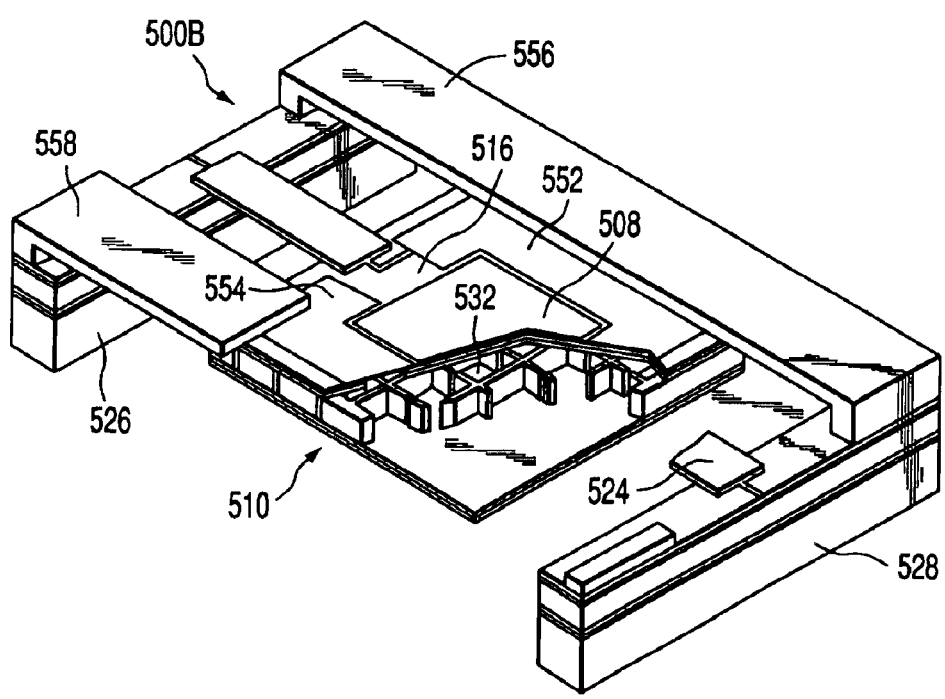
FIG. 27 shows the optical deflector using the mirror rocking member according to another modification of the fifth embodiment.

FIG. 27 shows an optical deflector using a mirror rocking member 500B according to another modification example of the fifth embodiment. In the mirror rocking member 500B, as shown in FIG. 27, driving electrodes 552, 554 are disposed on the reflective-surface forming surface 516 with the reflective surface 508 formed thereon. Moreover, fixed electrodes 556, 558 are disposed opposite to the driving electrodes 552, 554, respectively, and fixed to the support members 526, 528.

Since the driving electrodes 552, 554 are disposed on the reflective-surface forming surface 516 in the optical deflector using the mirror rocking member 500B, an area necessarily decreases and thereby the driving force is reduced. However, the reduction of the moment of inertia of the movable plate 510 as an advantage obtained by disposing the hollows 532 in the movable plate 510 is achieved. Moreover, it is also possible to form the electrode on the substantially whole reflective-surface forming surface so that the driving electrode also functions as the reflective surface, and to secure the driving force.

In the fifth embodiment, only the mirror rocking member 500 having the driving electrode for the optical deflector of the electrostatic driving system has been described with reference to the drawings, but the mirror rocking member may have the driving coil for the optical deflector of the electromagnetic driving system.

Figure 28:
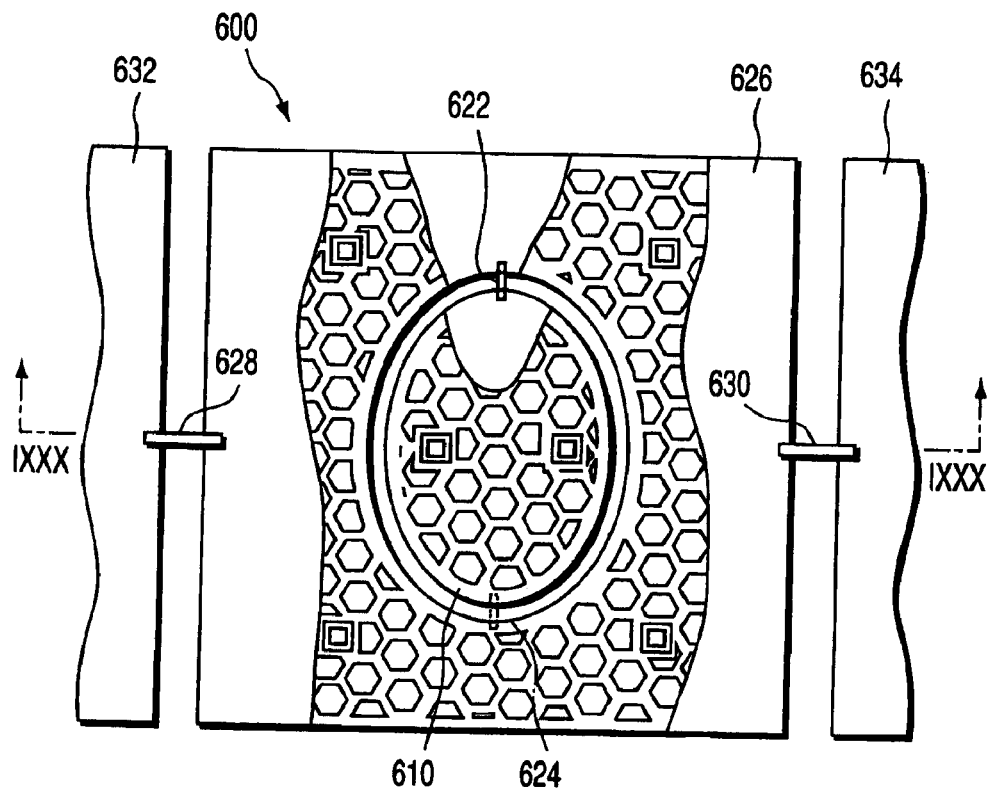
FIG. 28 shows the optical deflector using the mirror rocking member according to still another modification of the fifth embodiment.
Figure 29:
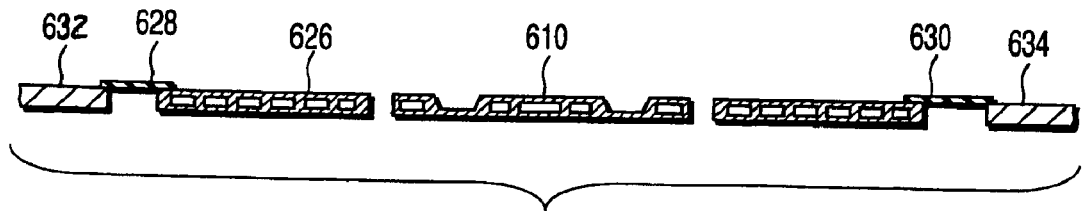
FIG. 29 is a sectional view of the mirror rocking member taken along line IXXX—IXXX of FIG. 28.

FIGS. 28 and 29 show a mirror rocking member 600 according to another modification example of the present embodiment. The mirror rocking member 600 is basically constituted by expanding the mirror rocking member 500 of the fifth embodiment in a gimbal structure.

As shown in FIGS. 28 and 29, the mirror rocking member 600 comprises an elliptical movable plate 610, a first pair of torsion bars 622, 624 for rockably supporting the movable plate 610, a movable frame 626 for holding the first pair of torsion bars 622, 624, a second pair of torsion bars 628, 630 for rockably supporting the movable frame 626, and support members 632, 634 for holding the second pair of torsion bars 628, 630. The first torsion bars 622, 624 extend at right angles to the second torsion bars 628, 630. Moreover, the movable plate 610 and movable frame 626 both have a plurality of hexagonal hollows defined by the honeycomb structure.

In the mirror rocking member 600, the movable plate 610 and movable frame 626 as movable portions both have hollows, and thereby the reduction of the moments of inertia of the portions is achieved. As described in the modification example of FIG. 26, the driving electrodes formed on the movable plate 610 and movable frame 626 may be constituted of silicon of the CZ type which is separated by the slits and which has a low resistivity.

Furthermore, in the mirror rocking member of the present embodiment, the movable plate having the hollows is basically formed by bonding the wafers. Therefore, the member may be prepared by appropriately mechanically processing and laminating plate-like components.

Some embodiments have been described concretely with reference to the drawings, but the present invention is not limited to the aforementioned embodiments, and includes all implementations within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mirror rocking member for an optical deflector, which comprises the mirror rocking member for deflecting light, and driving means for driving the member, the mirror rocking member comprising:

a movable plate having a reflective surface;

an elastic member for rockably supporting the movable plate; and a support for supporting the elastic member, the movable plate having an electric element, which constitutes a part of the driving means, the movable plate including a first portion having the reflective surface, and a second portion including an electric element, the first portion having a reflective-surface forming surface with the reflective surface formed thereon, the reflective-surface forming surface being reflective substantially throughout, the second portion having an electric-element forming surface with the electric element formed thereon, and the reflective-surface forming surface of the first portion being formed in such a shape as to be substantially inscribed in the electric-element forming surface of the second portion, wherein the reflective surface forming surface of the first portion has an area smaller than an area of the electric-element forming surface of the second portion, and the reflective-surface forming surface of the first portion is positioned opposite to the electric-element forming surface of the second portion in the direction of the thickness of the movable plate;

wherein the electric-element forming surface of the second portion has a rectangular shape, and the reflective-surface forming surface of the first portion has an elliptical shape and the first portion and second portion of the movable plate are substantially formed of the same material.

2. A mirror rocking member for an optical deflector, which comprises the mirror rocking member for deflecting light, and driving means for driving the member, the mirror rocking member comprising:

a movable plate having a reflective surface;

an elastic member for rockably supporting the movable plate; and a support for supporting the elastic member, the movable plate having an electric element, which constitutes a part of the driving means, the movable plate including a first portion having the reflective surface, and a second portion including an electric element, the first portion having a reflective-surface forming surface with the reflective surface formed thereon, the reflective-surface forming surface being reflective substantially throughout, the second portion having an electric-element forming surface with the electric element formed thereon, and the reflective-surface forming surface of the first portion being formed in such a shape as to be substantially inscribed in the electric-element forming surface of the second portion, wherein the reflective surface forming surface of the first portion has an area smaller than an area of the electric-element forming surface of the second portion, and the reflective-surface forming surface of the first portion is positioned opposite to the electric-element forming surface of the second portion in the direction of the thickness of the movable plate;

wherein the electric-element forming surface of the second portion has a rectangular shape, and the reflective-surface forming surface of the first portion has a dodecagonal shape and the first portion and second portion of the movable plate are substantially formed of the same material.

* * * * *